(12) United States Patent
White

(10) Patent No.: US 11,629,474 B2
(45) Date of Patent: Apr. 18, 2023

(54) MULTI-STAGE SUPPRESSOR FOR VIBRATING PILE DRIVER

(71) Applicant: John L. White, Seahurst, WA (US)

(72) Inventor: John L. White, Seahurst, WA (US)

( * ) Notice: Subject to any disclaimer, the term of this patent is extended or adjusted under 35 U.S.C. 154(b) by 0 days.

(21) Appl. No.: 16/869,923

(22) Filed: May 8, 2020

(65) Prior Publication Data
US 2021/0348353 A1 Nov. 11, 2021

(51) Int. Cl.
*E02D 13/00* (2006.01)
*F16F 3/087* (2006.01)
*F16F 15/08* (2006.01)
*E02D 11/00* (2006.01)

(52) U.S. Cl.
CPC ............ *E02D 13/00* (2013.01); *F16F 3/0876* (2013.01); *F16F 15/08* (2013.01); *E02D 11/00* (2013.01); *F16F 2224/025* (2013.01); *F16F 2230/0023* (2013.01)

(58) Field of Classification Search
CPC ............. F16F 3/0876; F16F 2230/0023; F16F 2224/025; E02D 13/00; E02D 11/00
See application file for complete search history.

(56) References Cited

U.S. PATENT DOCUMENTS

| | | | | |
|---|---|---|---|---|
| 3,620,026 A | * | 11/1971 | Mallard | .................... E02D 7/28 |
| | | | | 405/249 |
| 4,645,017 A | * | 2/1987 | Bodine | .................... E02D 7/18 |
| | | | | 173/162.1 |
| 5,117,925 A | * | 6/1992 | White | .................... E02D 11/00 |
| | | | | 173/162.1 |
| 5,263,544 A | | 11/1993 | White | |
| 7,080,958 B1 | * | 7/2006 | Morris | ...................... E02D 7/18 |
| | | | | 173/162.1 |
| 7,854,571 B1 | * | 12/2010 | Evarts | ....................... E02D 7/06 |
| | | | | 405/232 |
| 2018/0128338 A1 | * | 5/2018 | Tian | ....................... B64C 39/024 |

* cited by examiner

*Primary Examiner* — Melody M Burch
(74) *Attorney, Agent, or Firm* — Clark Puntigam

(57) ABSTRACT

A shock absorbing apparatus (suppressor) for a vibratory pile driver includes three suppressor sections, including a first section adapted and arranged to absorb a load up to a selected amount. A second suppressor section is adapted to absorb a load above the first shock-absorbing section, with a third suppressor system providing a transition between first and second suppressor action as load increases.

10 Claims, 25 Drawing Sheets

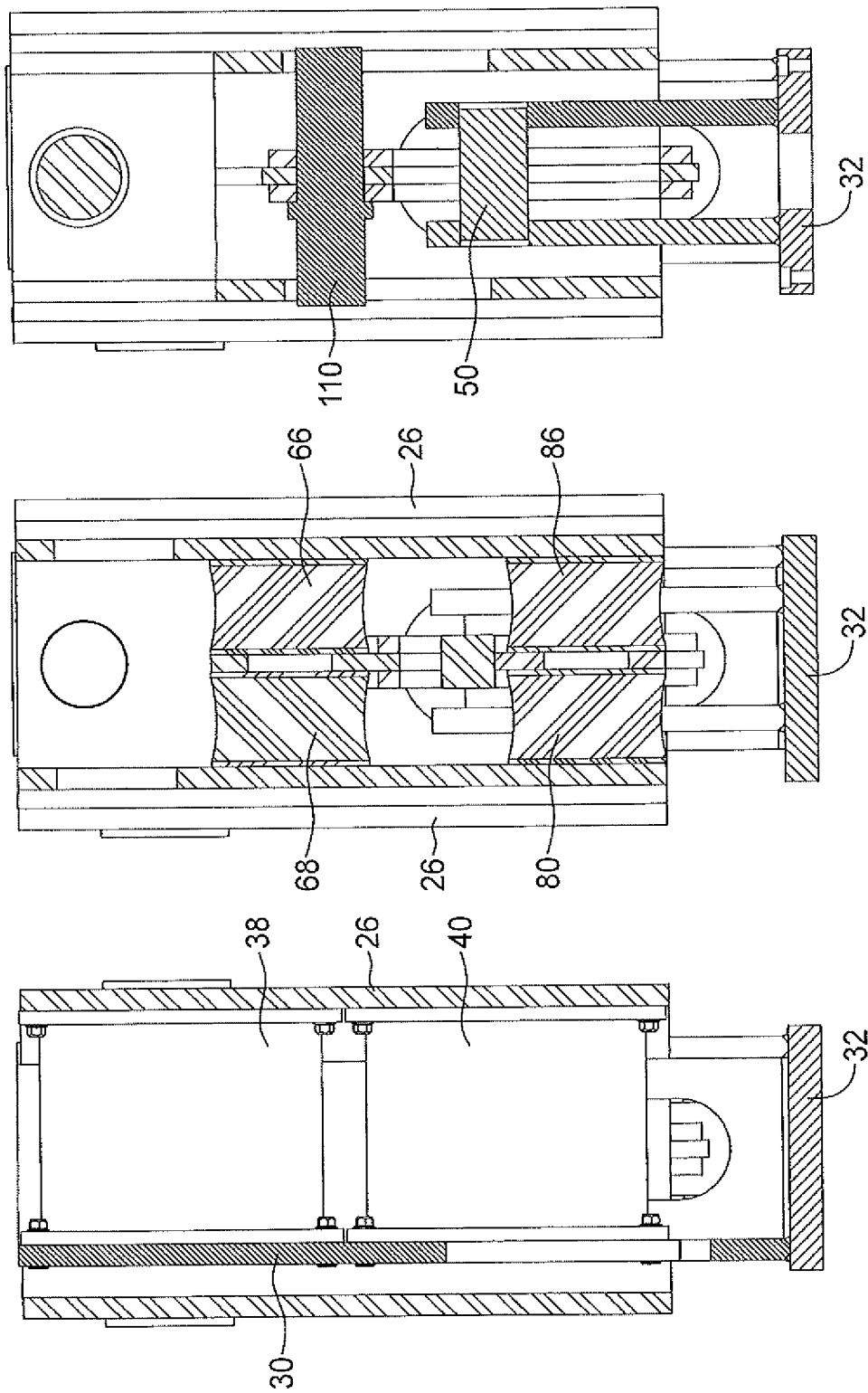

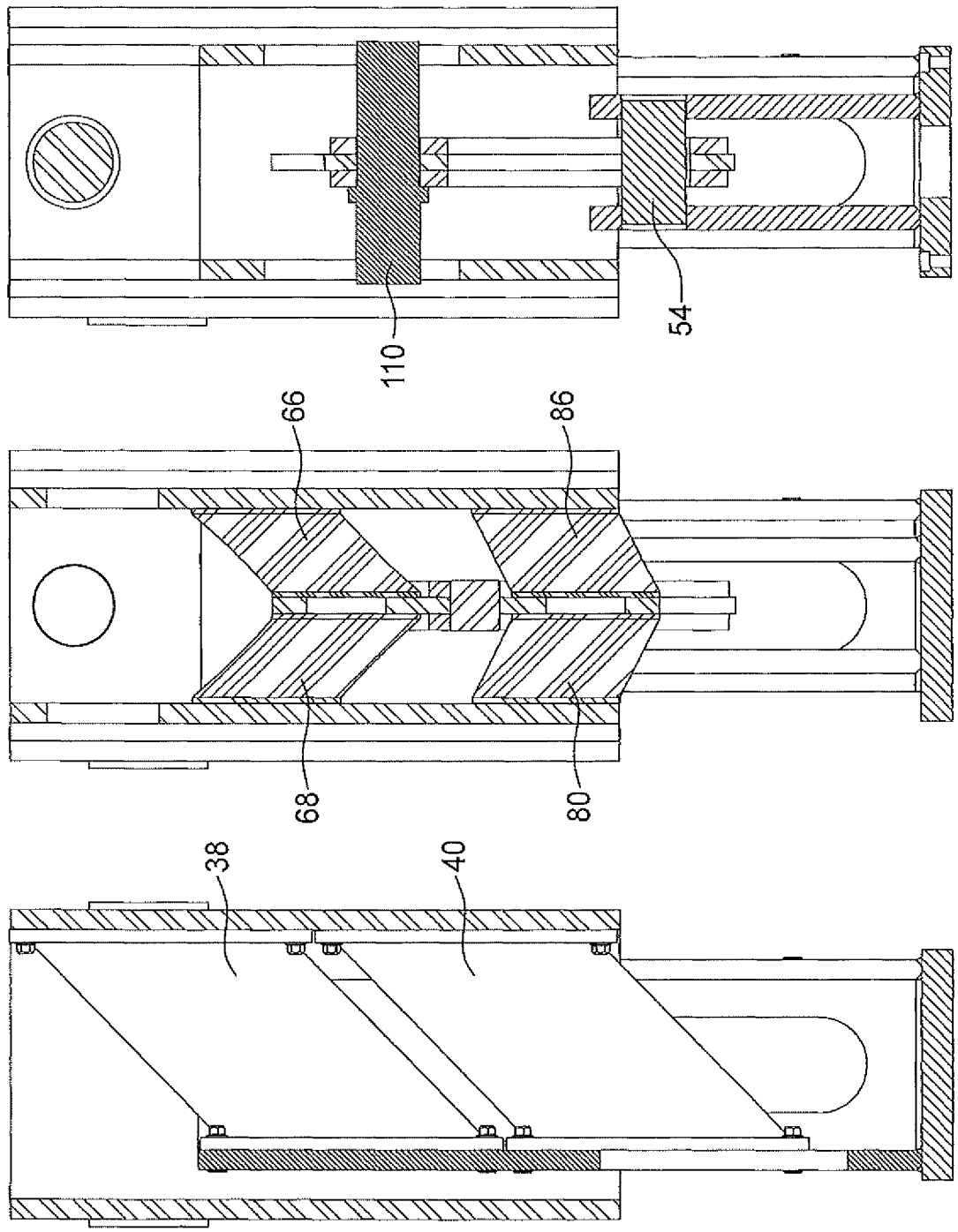

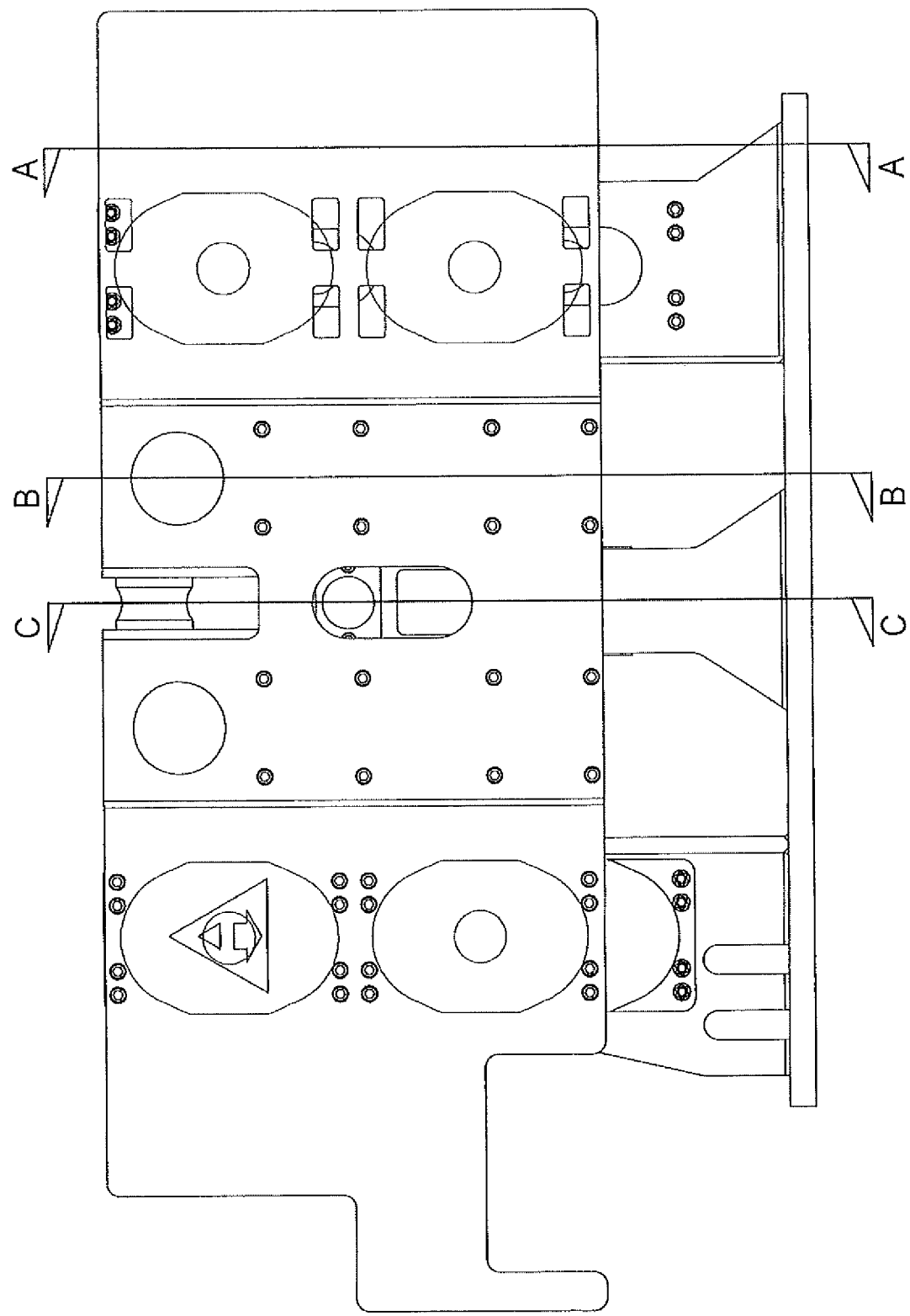

MULTI-STAGE SUPPRESSOR FOR VIBRATING PILE DRIVER

TECHNICAL FIELD

The present invention relates generally to a suppressor assembly for vibrating pile drivers, and more specifically concerns a multi-stage suppressor assembly.

BACKGROUND OF THE INVENTION

In the construction industry, it is sometimes necessary to drive piles (of various material) into the earth to provide a proper foundation for a building, bridge or other structure. A recent development involves driving piles into the ground with the use of a vibrating machine to cause what appears to be a continuous motion of driving the pile into the earth. An arrangement of such a vibratory machine includes a gearbox, driven by a motor, which provides a pair of weights which are mounted centrally for rotation about parallel axes with the direction of rotation being opposite one another, with the lateral forces being cancelled out, leaving the up and down vibrating force developed by the machine for application to the pile. One part of the machine is coupled to the upper end of the pile while a second part of the machine is connected through a shock-absorbing device, referred to as a suppressor, to a carrying member such as a cable from a large crane. When a pile is being driven into the ground in one mode of operation, the vibratory machine in large part acts substantially independently, in that only minimal exterior support is required. Sometimes, however, weights are added to the shock-absorbing device to provide downward force, which results in a need for shock absorption.

In another mode of operation, wherein a previously driven pile is extracted from the earth, it is necessary to impart a tension force on the pile so as to pull it upwardly out of the ground. The tension force is applied to the shock-absorbing device through the connecting cable, which pulls upwardly on the pile. Tension force exerted on the cable can vary greatly, between two tons to 100 tons.

It is important that the tension force produced in the pulling mode be effectively absorbed. U.S. Pat. No. 5,263,544 discloses a shock-absorbing system involving first and second shock-absorbing elements which operate such that when the tension load applied to the carrying member is relatively small, the vibratory force is resisted primarily by a system of first shock-absorbing elements and when the tension load applied to the carrying member is larger, the vibratory force is resisted primarily by a second system of second shock-absorbing elements. Such a combined or two-stage shock-absorbing system (suppressor) was a significant advance in suppressing the effects of the vibratory action when a pile is pulled from the earth. However, an important disadvantage of such a combined system occurs at the transition point between the first and second shock-absorbing element systems, where there is a substantial momentary increase in noise and vibrational effect, often leading to a concern relative to continued operation of the pile driver. The present invention is directed toward reducing or eliminating the transition action between the first and second stage suppressor systems.

SUMMARY OF THE INVENTION

Accordingly, the shock-absorbing apparatus for use with a pile driving and/or pile pulling vibratory device and a carrying member for supporting the vibratory device, the shock-absorbing system comprises: a base portion adapted for connection to the vibratory device; an outer housing section supported by a carrying member, wherein tension loads are applied to the carrying member; a first shock-absorbing assembly connected between the housing and the base portion for absorbing the vibratory action or force generated by the vibratory device for a selected range of tension load as the outer housing is raised; a second shock-absorbing assembly for absorbing the vibratory action or force generated by the vibratory device for a load greater than the selected range of tension load; a third shock-absorbing assembly operative to absorb vibratory action or force generated by the vibration device, arranged to produce a transition between the first and second tension loads and the operation of the first and second shock absorbing assemblies; and a stop element for limiting relative movement of the connecting elements in the event of a partial or complete breakdown of the first, second and third shock-absorbing assemblies.

BRIEF DESCRIPTION OF THE DRAWINGS

FIG. 8A is a cross-sectional view along lines AA of FIG. 7 when the suppressor assembly of the first embodiment is in a first position.

FIG. 8B is a cross-sectional diagram along lines BB in FIG. 7 when the suppressor assembly is in the first position.

FIG. 8C is a cross-sectional diagram along lines CC in FIG. 7 when the suppressor assembly is in a first position.

FIG. 11A is a cross-sectional diagram along lines AA in FIG. 7 when the suppressor assembly is in a fourth position.

FIG. 11B is a cross-sectional diagram along lines BB in FIG. 7 when the suppressor assembly is in a fourth position.

FIG. 11C is a cross-sectional diagram along lines CC in FIG. 7 when the suppressor assembly is in a fourth position.

FIG. 18 is a profile view of the suppressor system housing of the second embodiment showing the cross-section lines AA, BB and CC of FIGS. 8-12.

BEST MODE FOR CARRYING OUT THE INVENTION

Figure 1:
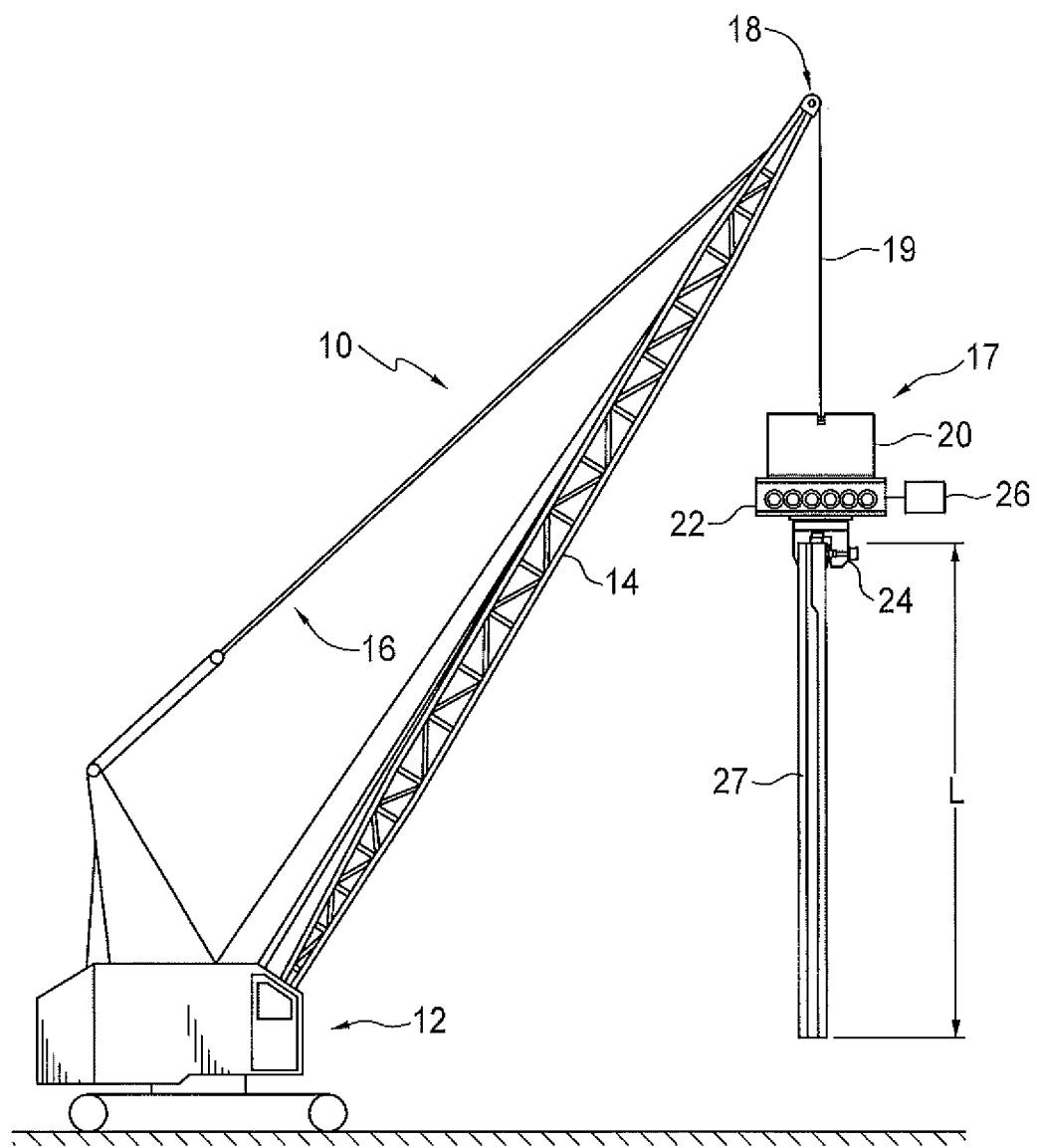
FIG. 1 is a schematic view of a vibratory pile driver.

FIG. 1 shows a vibratory pile driver, essentially a pile driver system, shown generally at 10. The system includes a conventional construction crane 12 with an extending boom 14 and a system of control cables, shown generally at 16, at the upper end 18 of which is a boom 14 control cable 19 which extends downwardly to a vibratory pile driver system shown generally at 17. The cables comprise a carrying system. The assembly generally includes a suppressor 20 which is the subject of the present invention, a gearbox 22 and a drive motor 26. Drive motor 26 is usually hydraulic, although it could be an electric motor as well. Clamp 24 clamps gearbox 22 onto a pile 27. The pile driver in one mode of operation drives the pile into the earth while in another mode extracts an existing pile from the earth.

Figure 2:
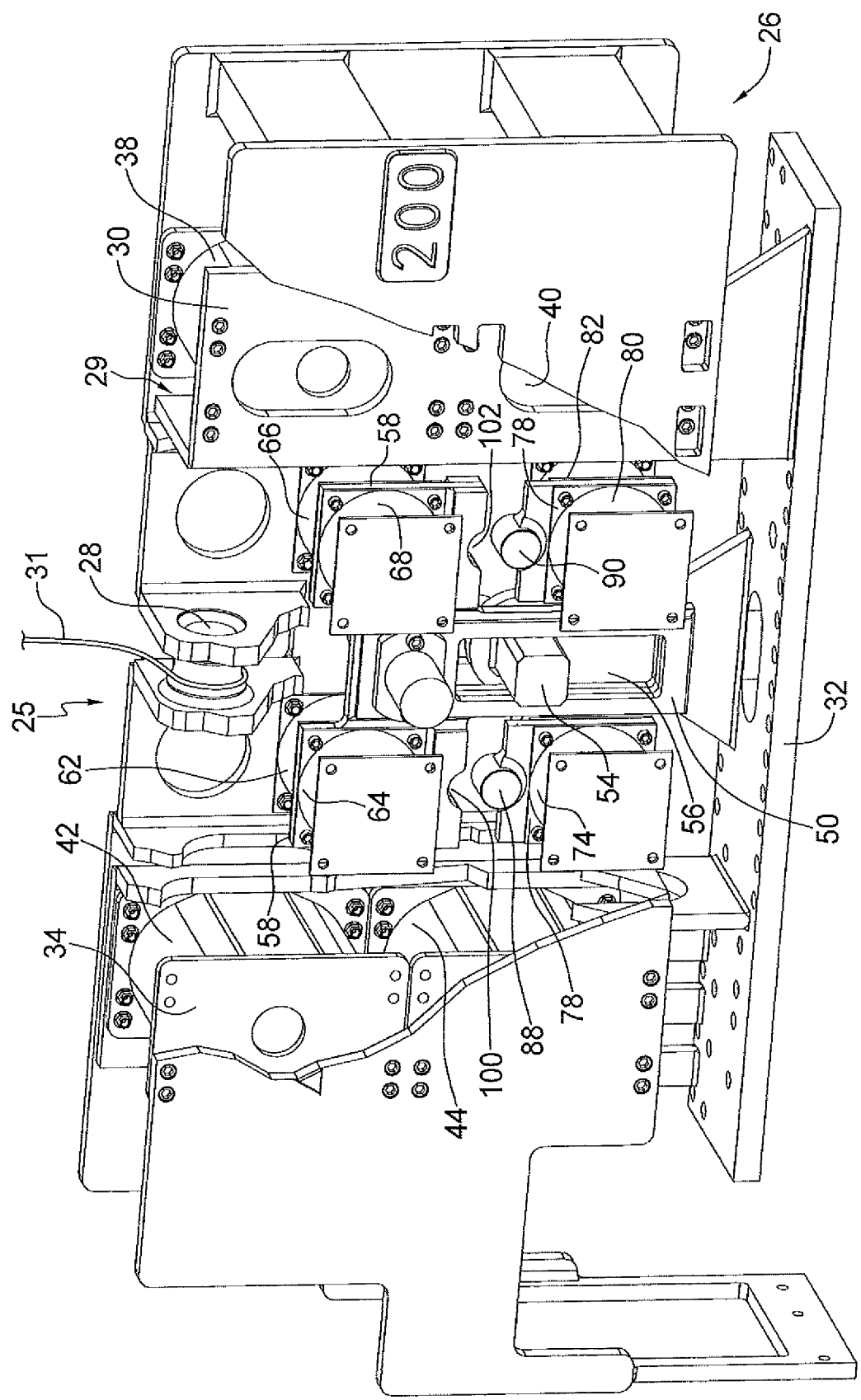
FIG. 2 is a schematic, partially cutaway, view of a first embodiment of the present suppressor assembly in a first position with zero load.

FIG. 2 shows a cutaway view of a first embodiment of the suppressor assembly 25 of the present invention in a first position. It includes an outer housing 26 with an opening 28 at an upper midpoint to which a cable 31 is secured in conventional fashion. The suppressor assembly includes an internal assembly which includes a bottom plate or base 32 which is secured to the top of the gearbox (FIG. 1). The suppressor assembly 25 also includes an inner support structure 29 with one portion 30 at one end of the outer housing 26 and the other portion 34 being at the opposing end of the housing 26. Positioned in each portion 30 and 34 are two spaced large elastomeric shock-absorbing members 38 and 40 in one portion and 42 and 44 in the opposing portion.

FIG. 2 shows the suppressor assembly housing is a first position with no tension on the carrying member (cable). FIG. 8A shows the two large elastomeric members 38 and 40 in cross-section with no tension. The four large elastomeric members are generally capable of absorbing tension (load) up to several tons. A suppressor assembly using only large elastomeric members is generally referred to as a one stage suppression system. In a two stage suppression system, a plurality of small, stiffer elastomeric members are used in addition to provide an increased tension absorbing capability.

The suppressor assembly of the present invention is referred to as a three-stage system. This is illustrated in a first embodiment in FIG. 2. The embodiment includes a T-plate 50 with an open center area 56. The T-plate 50 is attached securely to the outer housing 26 and moves upwardly with it as tension (load) is increased. Extending through open center 56 of the T-plate 50 is a crossbar 54. Crossbar 54 is secured to the base 32 of the suppressor assembly through an internal assembly. Secured to the outer housing assembly 26 is an upper center mounting plate 58. Secured to and extending between the upper center plate 58 and the opposing sides of the outer housing assembly 26 are first and second sets of small elastomeric members which are relatively stiff. Elastomeric members 62 and 64 (first set) are attached to the left half of the upper center mounting plate 58 at one side of the T-plate and elastomeric members 66 and 68 (second set) are attached to the other (right) half of the upper center plate at the other side of the T-plate 50. Elastomeric members 62, 64, 66 and 68 operate together as the housing assembly 26 moves upwardly under increasing tension from the cable, as the pile driver attempts to extract a pile from the earth. This arrangement is referred to as a two stage suppressor assembly.

Third and fourth sets of small, stiff elastomeric members include elastomeric members 72 (not shown) and 74 which extend between a lower center plate 78 and the opposing outer sides of the outer housing assembly 26, while elastomeric members 80 and 82 extend between lower center plate 84 and the opposing outer sides of the housing assembly 26. In summary, there are two elastomeric members 62, 64 in set number 1, two elastomeric members 66, 68 in set number 2, two elastomeric members 74, 76 in set number 3 and two elastomeric members 80, 82 in set number 4. In operation of the present three-stage suppressor assembly of the present invention, elastomeric sets number 1 and 2 operate together, and elastomeric sets number 3 and 4 operate together. The combination of the large elastomeric members and the first and second and third and fourth sets of small elastomeric members form the three stage suppressor assembly of the present invention.

Referring still to FIG. 2, the upper center plate 78 of elastomeric member sets 3 and 4 include pin portions 88 and 90, upper portions of which extend above the top edge of lower center mounting plate 78, while the lower edge of upper center mounting plate 58 includes concave portions 100 and 102 adapted and configured to receive said portions of pin portions 88 and 90. The elastomeric members are shown in cross-sectional diagram 8B, again without tension.

Figure 3:
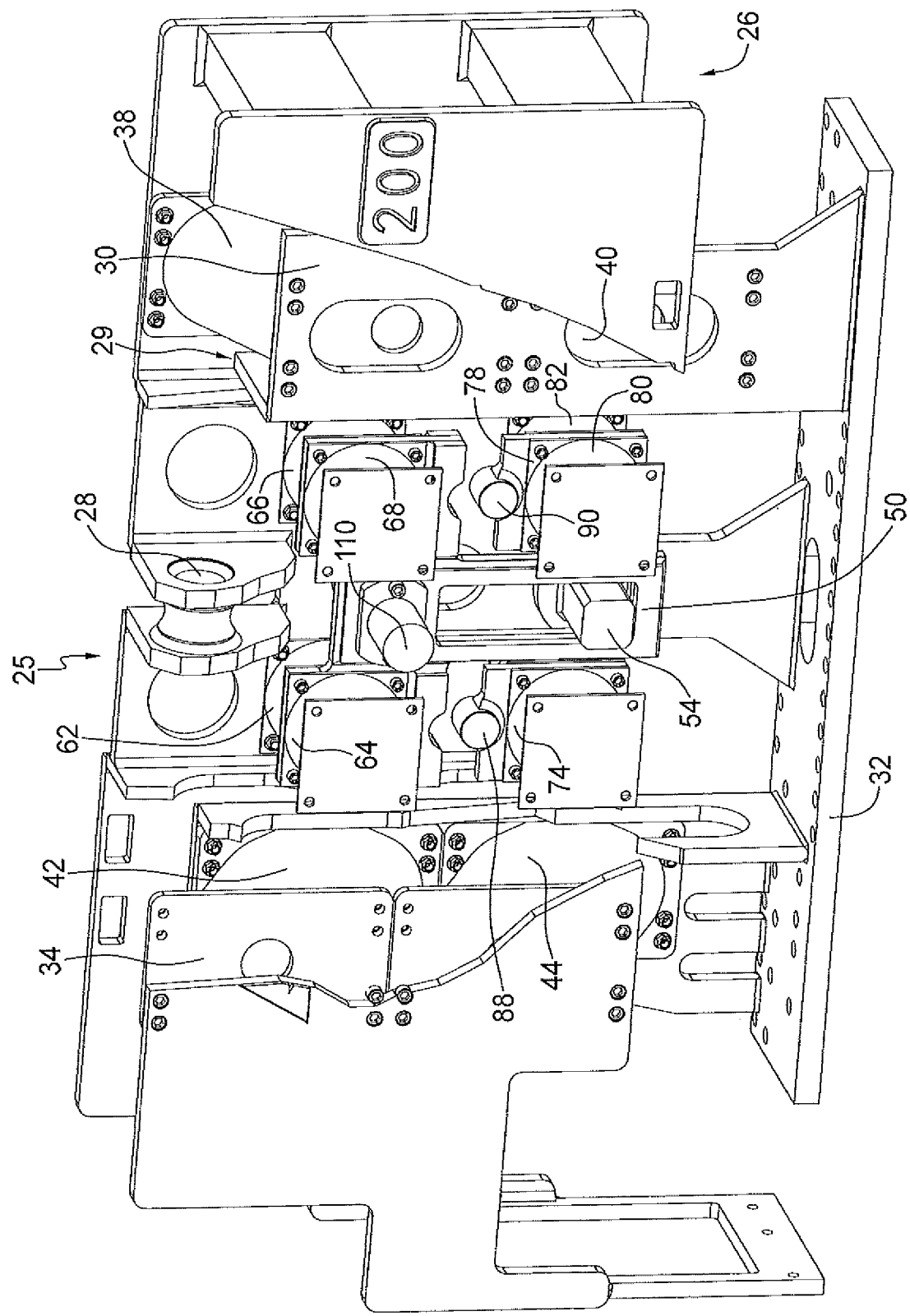
FIG. 3 is a schematic, partially cutaway, view of the first embodiment in a second position and a first load.
Figure 9C:
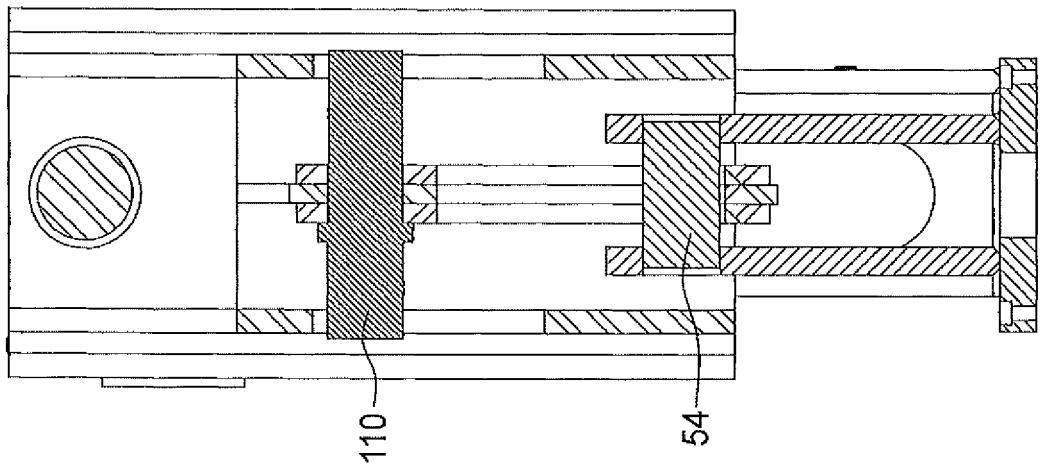
FIG. 9C is a cross-sectional diagram along lines CC in FIG. 7 when the suppressor assembly is in a second position.
Figure 9B:
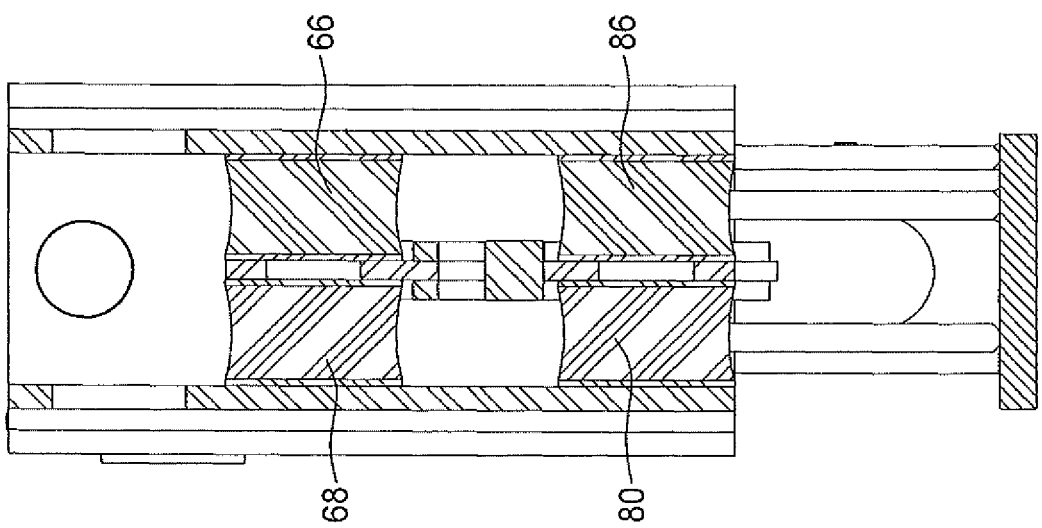
FIG. 9B is a cross-sectional diagram along lines BB in FIG. 7 when the suppressor assembly is in a second position.
Figure 9A:
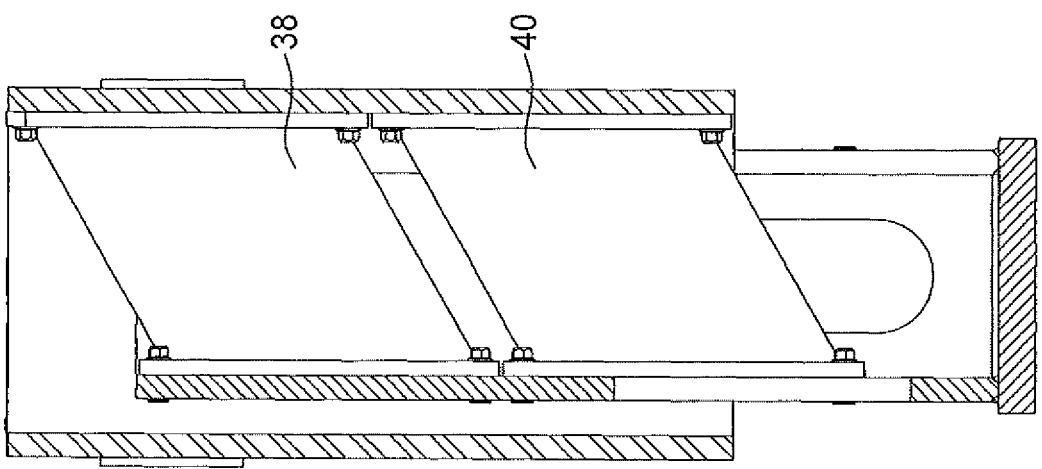
FIG. 9A is a cross-sectional diagram along lines AA in FIG. 7 when the suppressor assembly is in a second position.

In operation, as tension is increased during pulling, housing 26 elevates. This results in crossbar 54 being now positioned at the bottom of T-plate 50 (FIG. 3), i.e. T-plate 50 in effect is locked by crossbar 54. In the embodiment shown, the raised distance for one example is approximately seven inches. During this movement, the outboard large elastomeric members 38, 40, 42, 44 absorb the increased tension by stretching. This is a first-stage suppressor action. FIGS. 9A-9C show cross-sections, illustrating the stretching of the large elastomeric members due to some degree of load but no stretching of any of the small, stiff elastomeric members yet, because the load has not exceeded the capability of the large elastomeric members.

Figure 4:
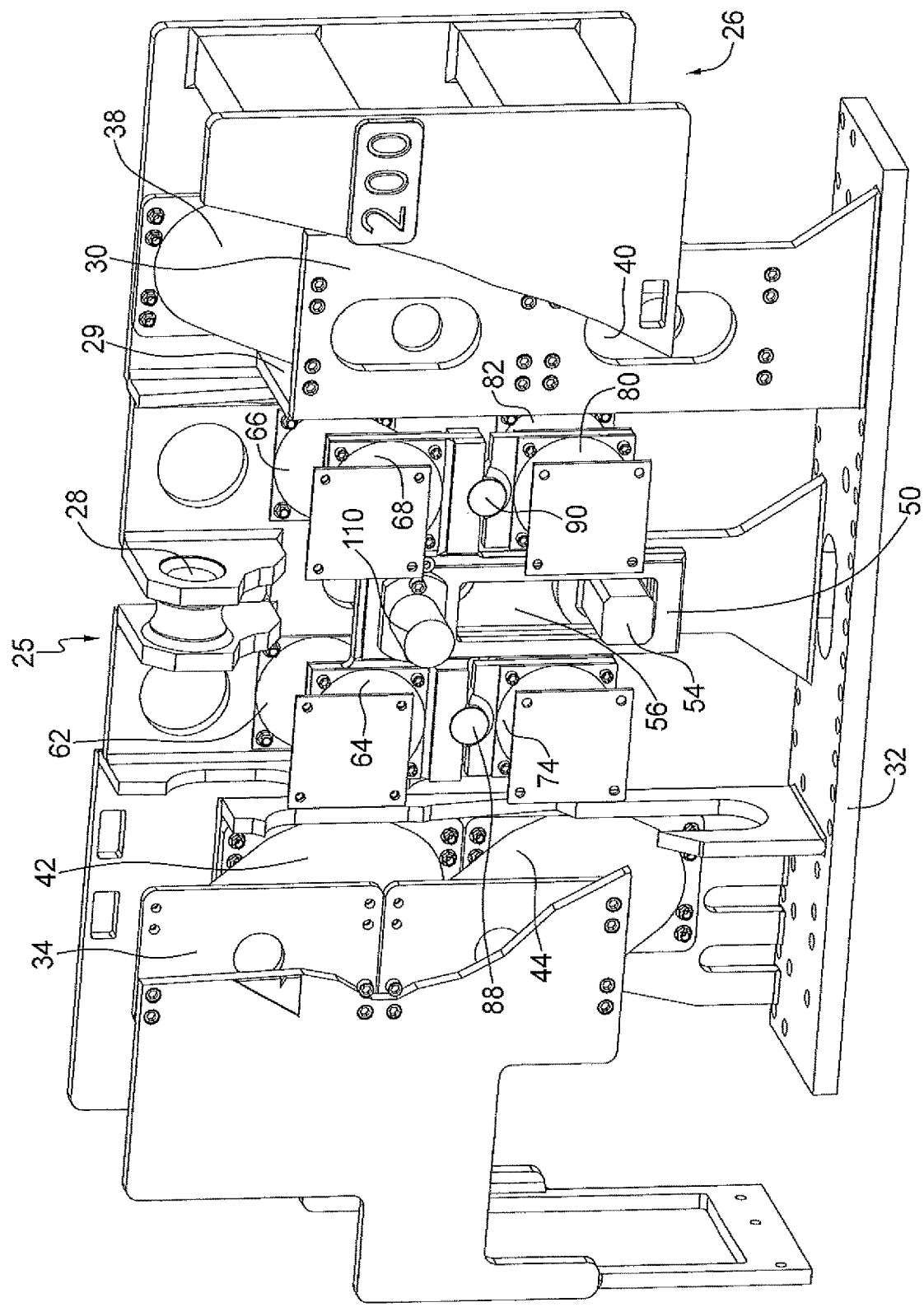
FIG. 4 is a schematic, partially cutaway view of the first embodiment in a third position with a second load.
Figure 10C:
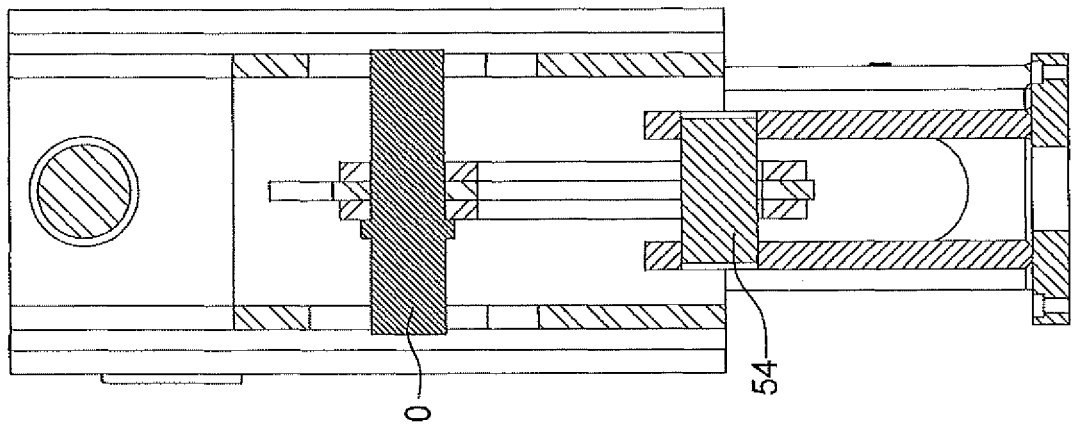
FIG. 10C is a cross-sectional diagram along lines CC in FIG. 7 when the suppressor assembly is in a third position.
Figure 10B:
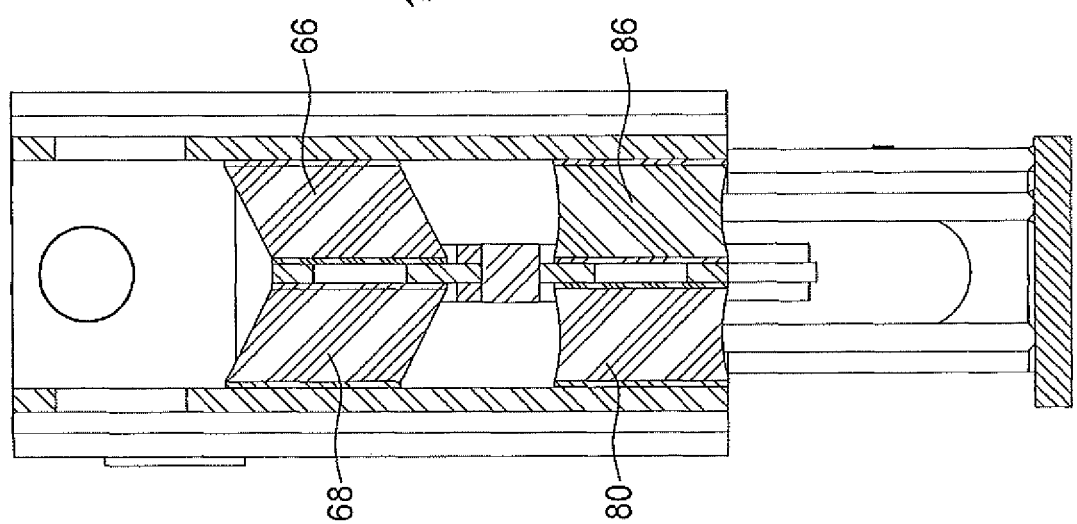
FIG. 10B is a cross-sectional diagram along lines BB in FIG. 7 when the suppressor assembly is in a third position.
Figure 10A:
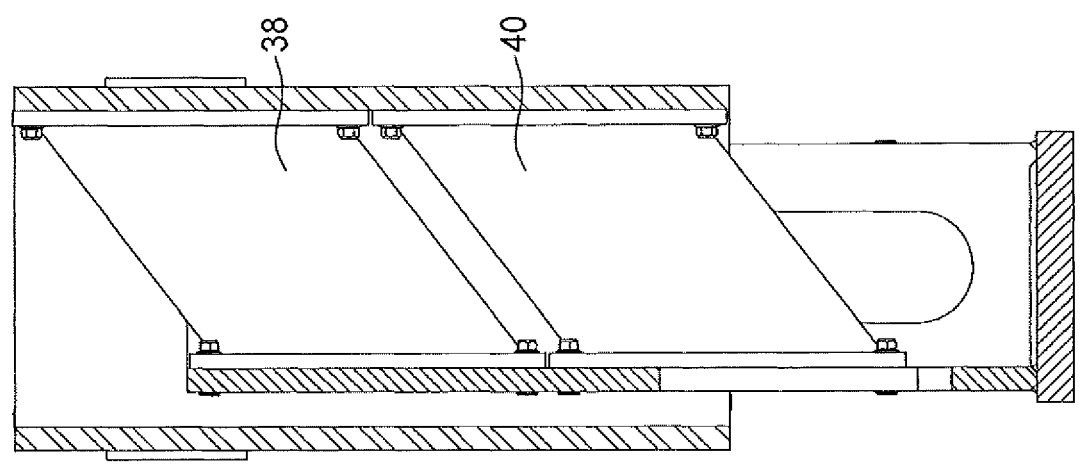
FIG. 10A is a cross-sectional diagram along lines AA in FIG. 7 when the suppressor assembly is in a third position.

At seven inches of upward movement of the housing, for example, the T-plate 50 is in effect locked by crossbar 54. As the housing 26 is moved upwardly under increased tension in the cable, small elastomeric members 62, 64, 66, and 68 (FIG. 2) begin to stretch to absorb the increased tension. FIG. 4 shows the effect of a total movement for example of 9.5 inches, during which the first and second sets of small elastomeric members stretch, absorbing the increase in load. This is referred to as a second-stage suppressor action. At this point in the embodiment shown, the pin sections 88 and 90 mate with concave portions 100 and 102 of upper mounting plate 58. The small elastomeric members 62, 64, 66 and 68 stretch considerably, but the third and fourth elastomeric members 72, 74, 80 and 82 have not yet begun to stretch. Cross-sections at 9.5 inches are shown in FIGS. 10A-10C. As indicated above, the transition between the first stage and the second stage suppressors is typically harsh and disconcerting to the operator.

Figure 5:
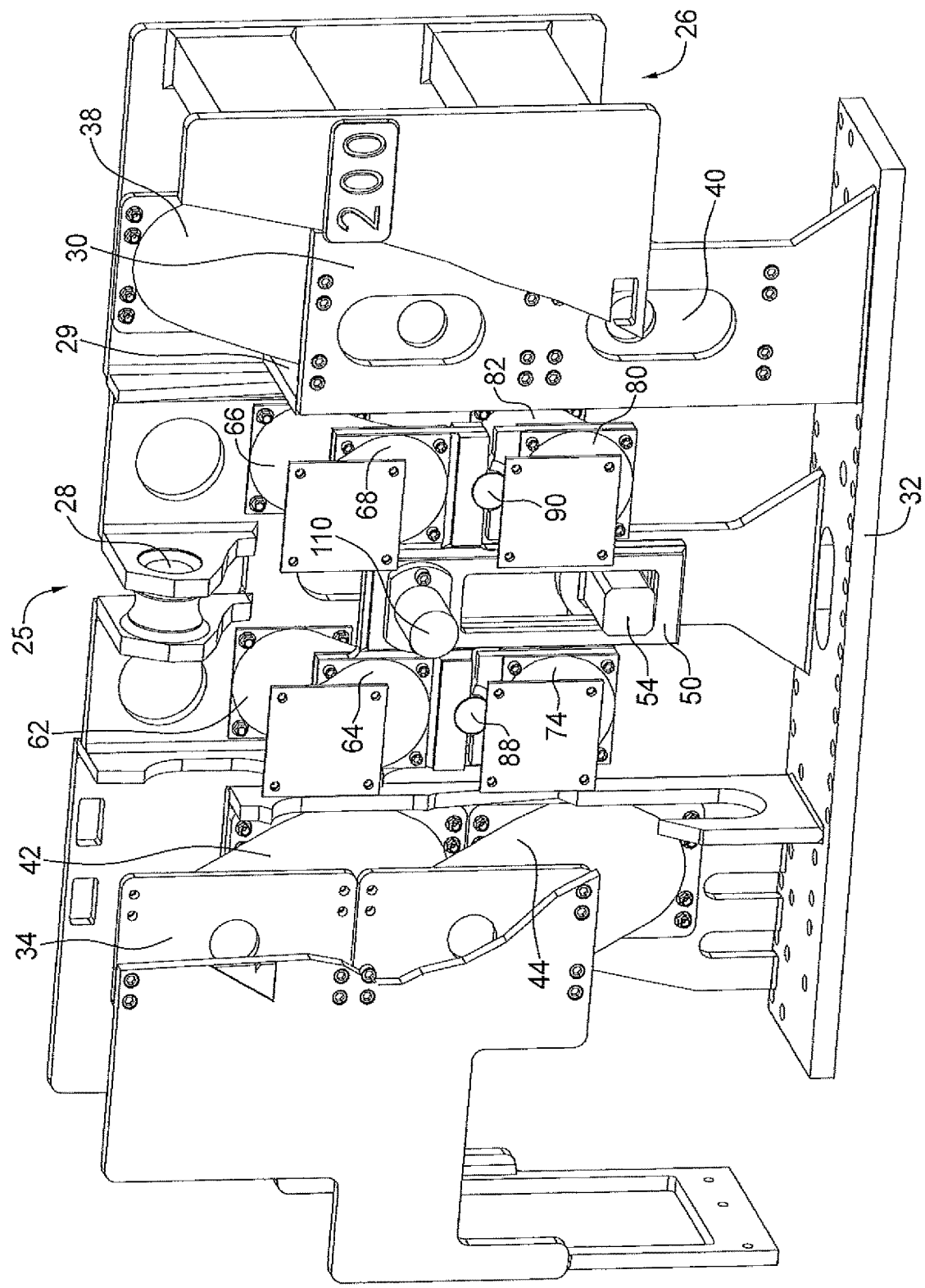
FIG. 5 is a schematic, partially cutaway, view of the first embodiment in a fourth position and a third load.
Figure 6:
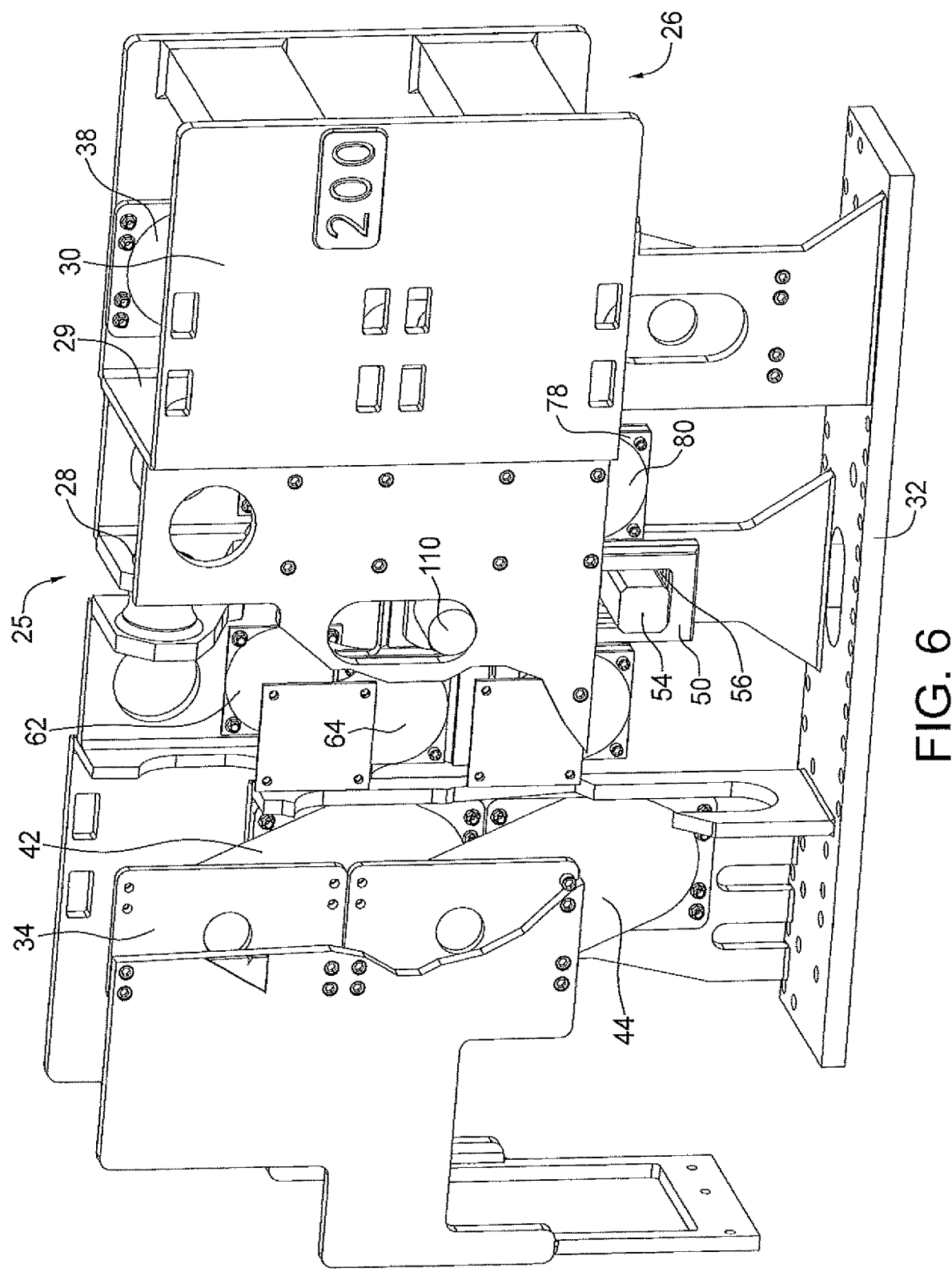
FIG. 6 is a schematic, partially cutaway, view of the first embodiment in a fifth position and a fourth load.
Figure 7:
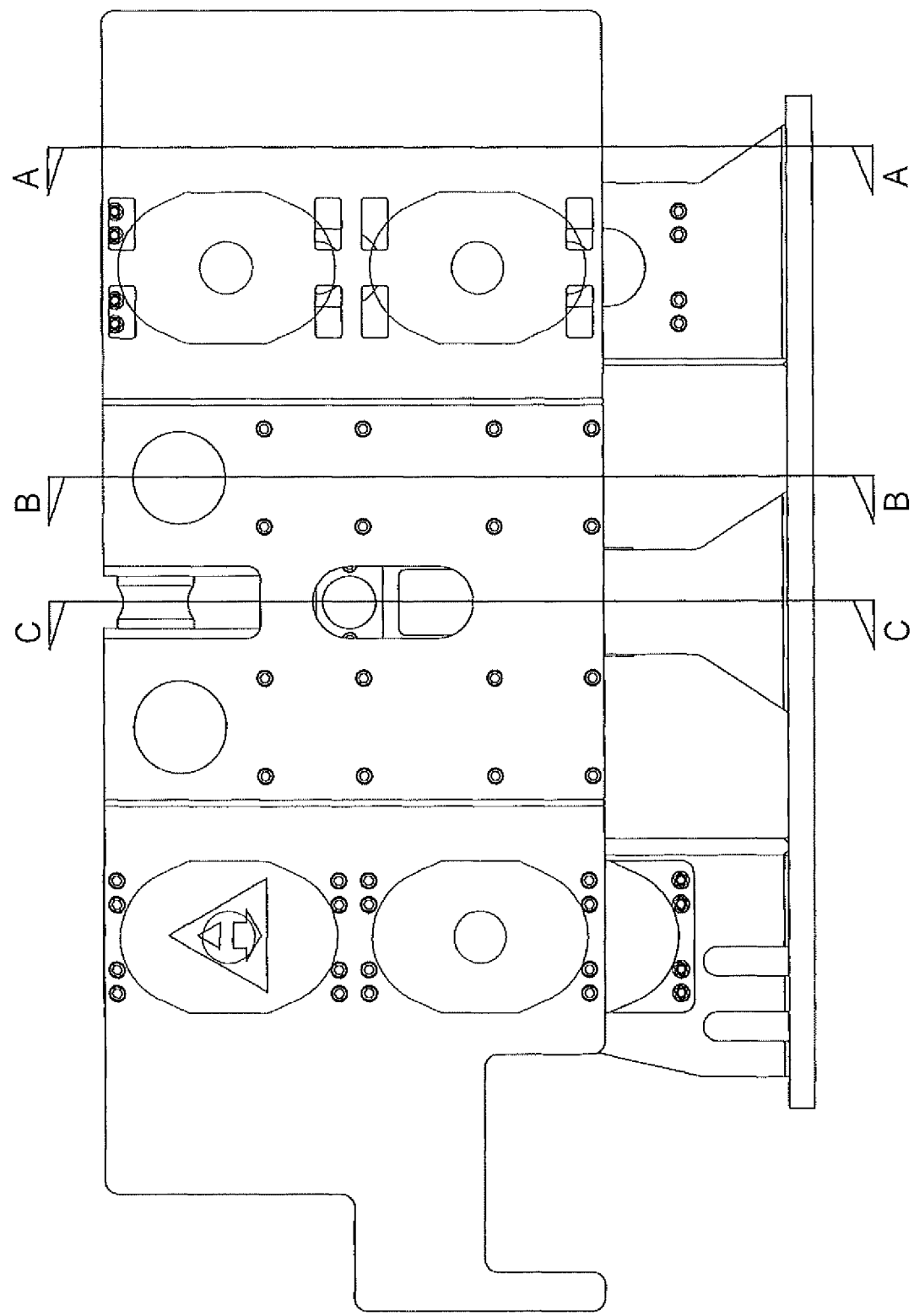
FIG. 7 is a profile view of the suppressor assembly housing of the first embodiment showing the cross-section lines AA, BB and CC of FIGS. 8-12.
Figure 12C:
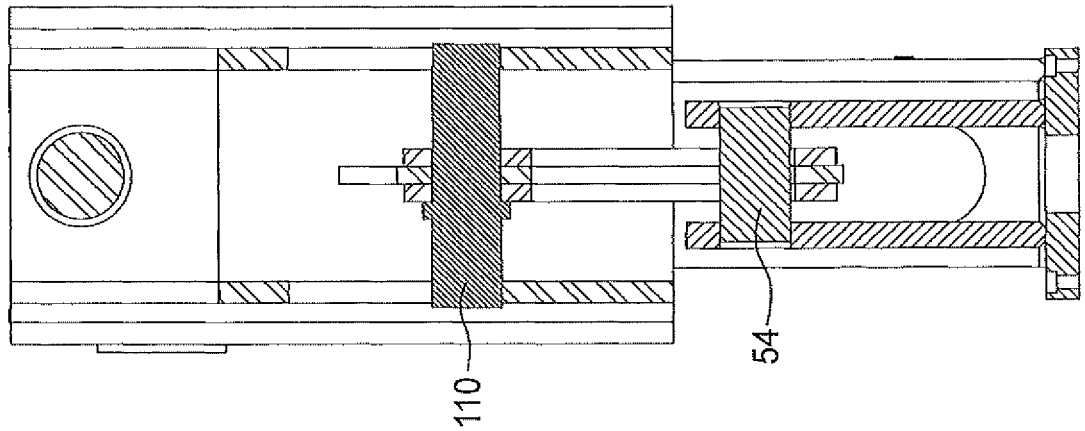
FIG. 12C is a cross-sectional diagram along lines CC in FIG. 7 when the suppressor assembly is in a fifth position.
Figure 12B:
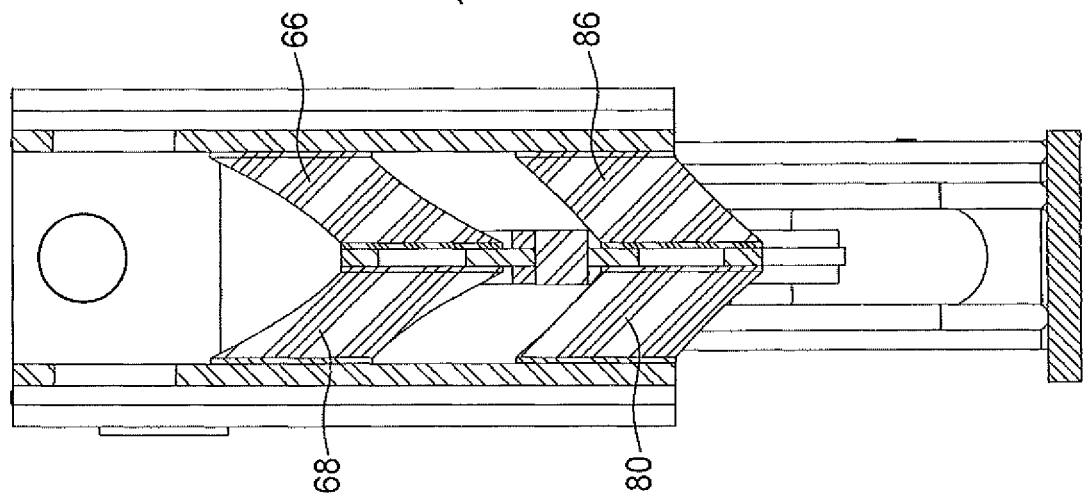
FIG. 12B is a cross-sectional diagram along lines BB in FIG. 7 when the suppressor assembly is in a fifth position.
Figure 12A:
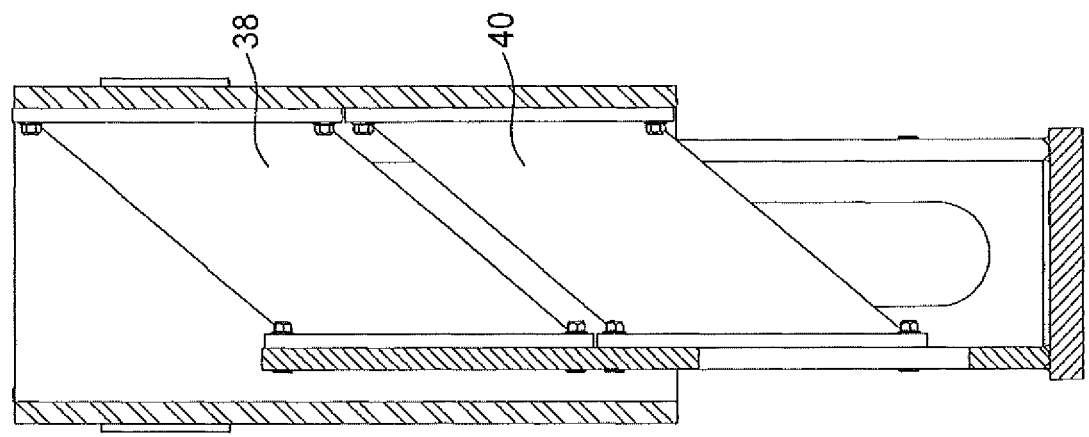
FIG. 12A is a cross-sectional diagram along lines AA in FIG. 7 when the suppressor assembly is in a fifth position.

In the present invention, the use of first and second (upper) sets of small elastomeric elements, second stage suppressor action, combined with third and fourth (lower) sets of small elastomeric elements provide a three-stage suppressor action with a smooth transition for high loads between the first and second stage suppressor action. Further movement of the housing, as load continues to increase, is shown in FIG. 5. During this movement, the large elastomeric members continue to stretch, the upper sets of small elastomeric members continue to stretch, and now the lower sets of elastomeric members begin to stretch as well. This arrangement, where the first and second (upper) sets of elastomeric members stretch first, followed by the third and fourth (lower) sets, as the housing moves under increasing load, results in a smoother transition between the large elastomeric members with a tension force of, for example, 4.8 tons per inch, to a tension force of, for example, 8 tons per inch. Other tension force examples are possible, depending on the system. FIGS. 11A-11C show the suppressor assembly at 12.0 inches. At this point, all eight small elastomeric members are stretching, in addition to the four large elastomeric members as the suppressor assembly is moved upwardly. Further movement of the outer housing, up to 14.5 inches, is shown in FIG. 6, with the inner assembly and base moving upwardly, raising the pile driver and the pile. FIGS. 12A-12C shows significant stretching of the first and second sets of small elastomeric members and the third and fourth sets of small elastomeric members.

As the outer housing lifts, with the inner assembly and the base moving upwardly lifting the pile driver, there is a smooth transition between the stretching of the large elastomeric members and the small stiff elastomeric members, a three-stage suppression action. The illustrations herein use upward movement of the housing of 0, 7 inches, 9 inches, 12 inches and 14.5 inches for an increasing load. Other dimensions can be used by modifying the structure. Referring again to FIGS. 2-12, a safety pin 110 provides a safety for the machine in the event that all of the elastomeric members fail or sheer.

In addition, a nylon pad is shown at 112 to further absorb transition noise and action. Such a pad can be easily replaced when necessary.

Figure 13:
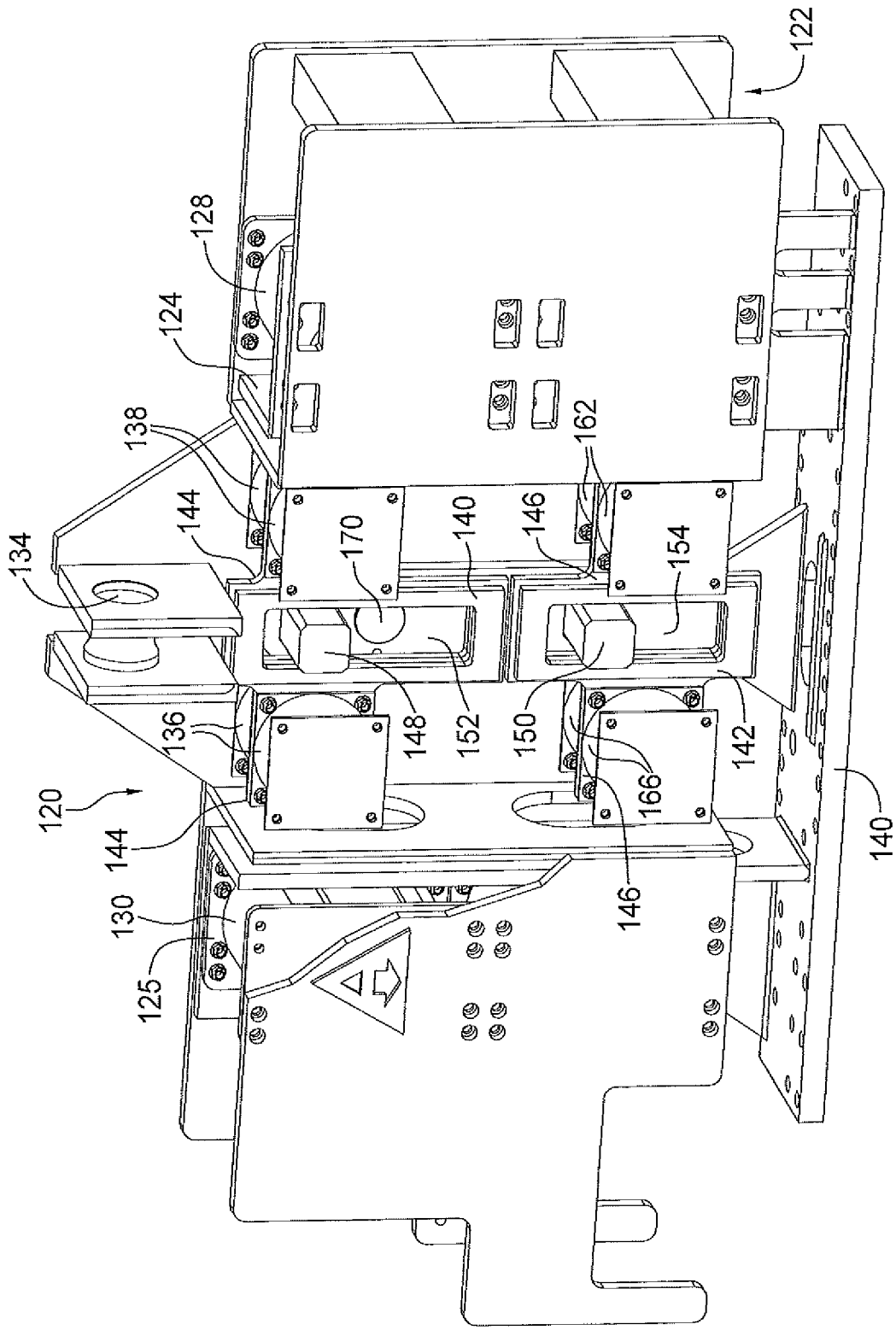
FIG. 13 is a schematic, partially cutaway, view of a second embodiment of the present invention in a first position with zero load.

FIGS. 13-23 are directed toward a second embodiment of the three-stage suppression system using two T-plates and two associate crossbars, with large elastomeric members and four sets of small elastomeric members. The three-stage suppressor assembly 120 includes an outer housing 122 and an inner housing comprising two parts 124, 125 which are attached to base 140 which is secured to the gearbox of the pile driver (FIG. 1). Two large elastomeric members 126, which is not shown in FIGS. 13 and 128 are positioned on one side of the suppressor assembly and four large elastomeric members 130 and 132 which is not shown in FIG. 13 are positioned on the other side of the suppressor assembly, similar to the first embodiment. An opening 134 receives the carrying member cable (not shown) from the crane. The suppressor assembly 120 includes two centrally located T-plates 140 and 142. Upper T-plate 140 is mounted directly above lower T-plate 142. T-plate 140 is mounted to upper mounting plate 144, while lower T-plate 142 is mounted to lower mounting plate 146. The upper and lower central plates are connected to the outer housing assembly which moves upwardly under tension/load.

Two crossbars 148 and 150 are mounted to extend through central openings 152, 154, respectively, of the T-plates. The crossbars are mounted so they do not move until they lock their respective T-bars.

Mounted to upper mounting plate 144 and front and rear support plates are first and second (upper) sets of small, stiff elastomeric members 136 and 138 (each set comprising two back-to-back small elastomeric members). The structure and characteristics of the first and second elastomeric member sets are similar to the corresponding sets in the embodiment of FIGS. 2-12. Further, the second embodiment includes third and fourth (lower) sets 160 and 162 of small, stiff elastomeric members. The third and fourth elastomeric member sets 160 and 162 are similar to corresponding sets of elastomeric members in the first embodiment.

Figure 14:
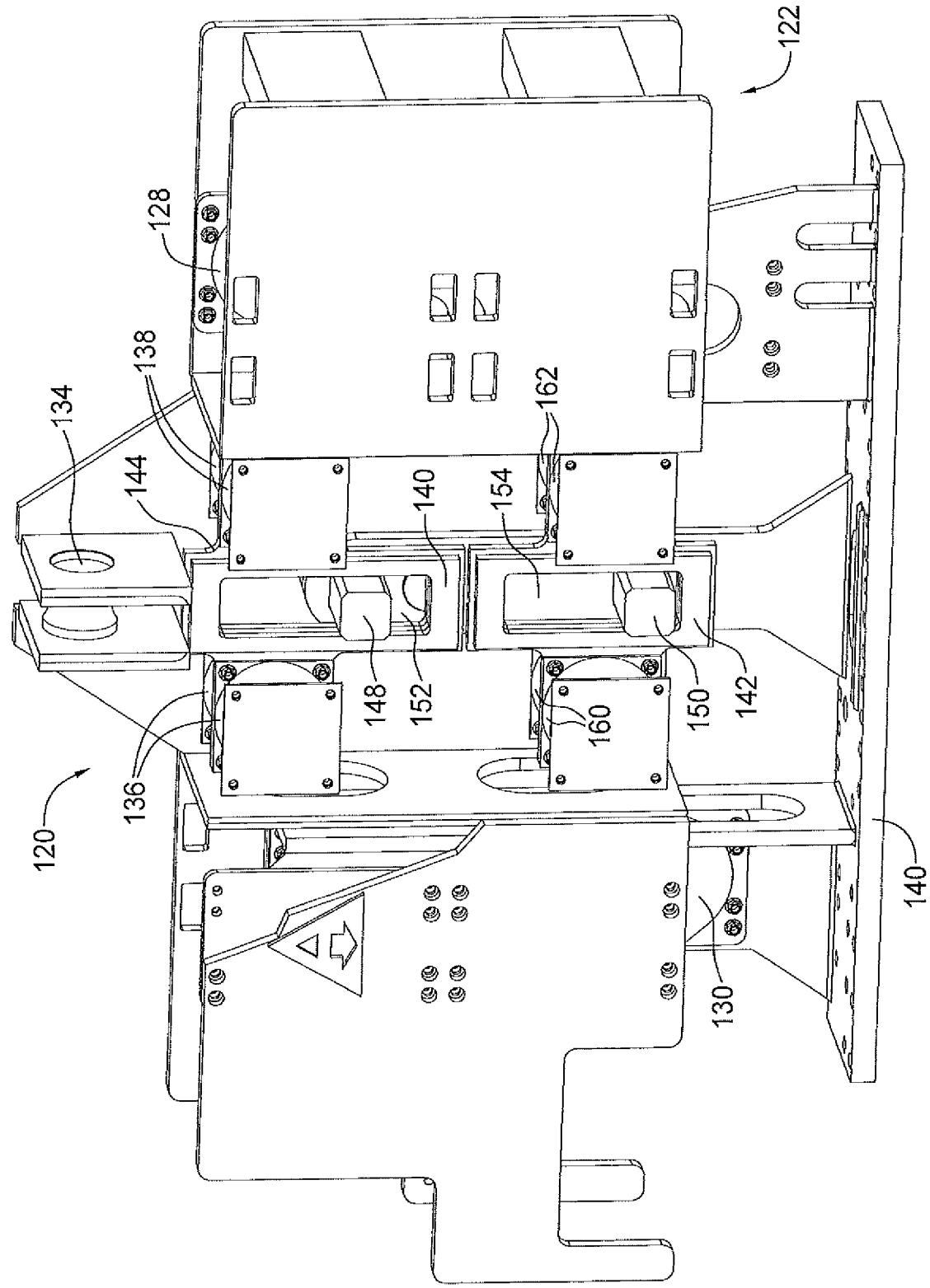
FIG. 14 is a schematic, partially cutaway, view of the second embodiment in a second position with a first load.
Figure 15:
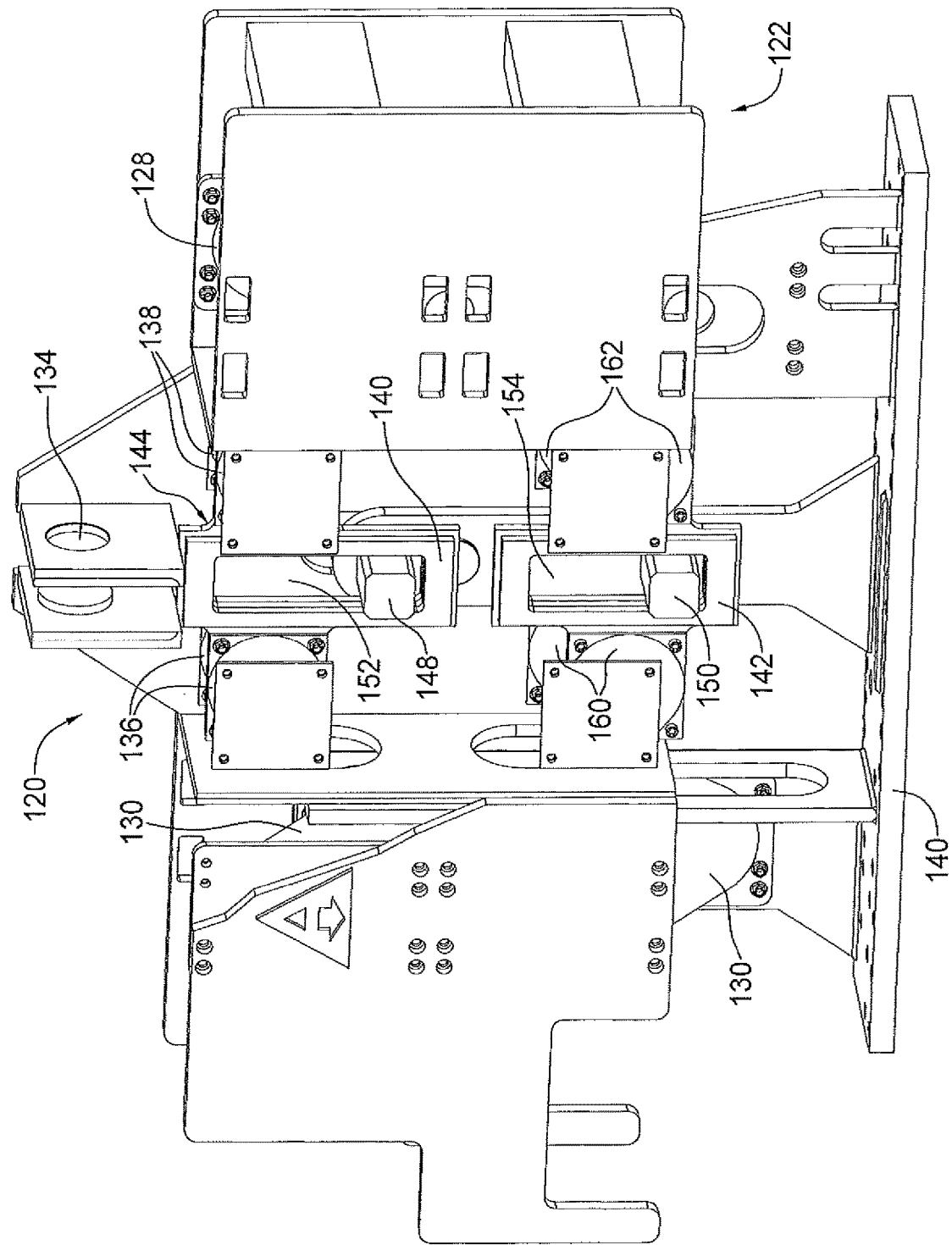
FIG. 15 is a schematic, partially cutaway, of the second embodiment in a third position with a second load.
Figure 16:
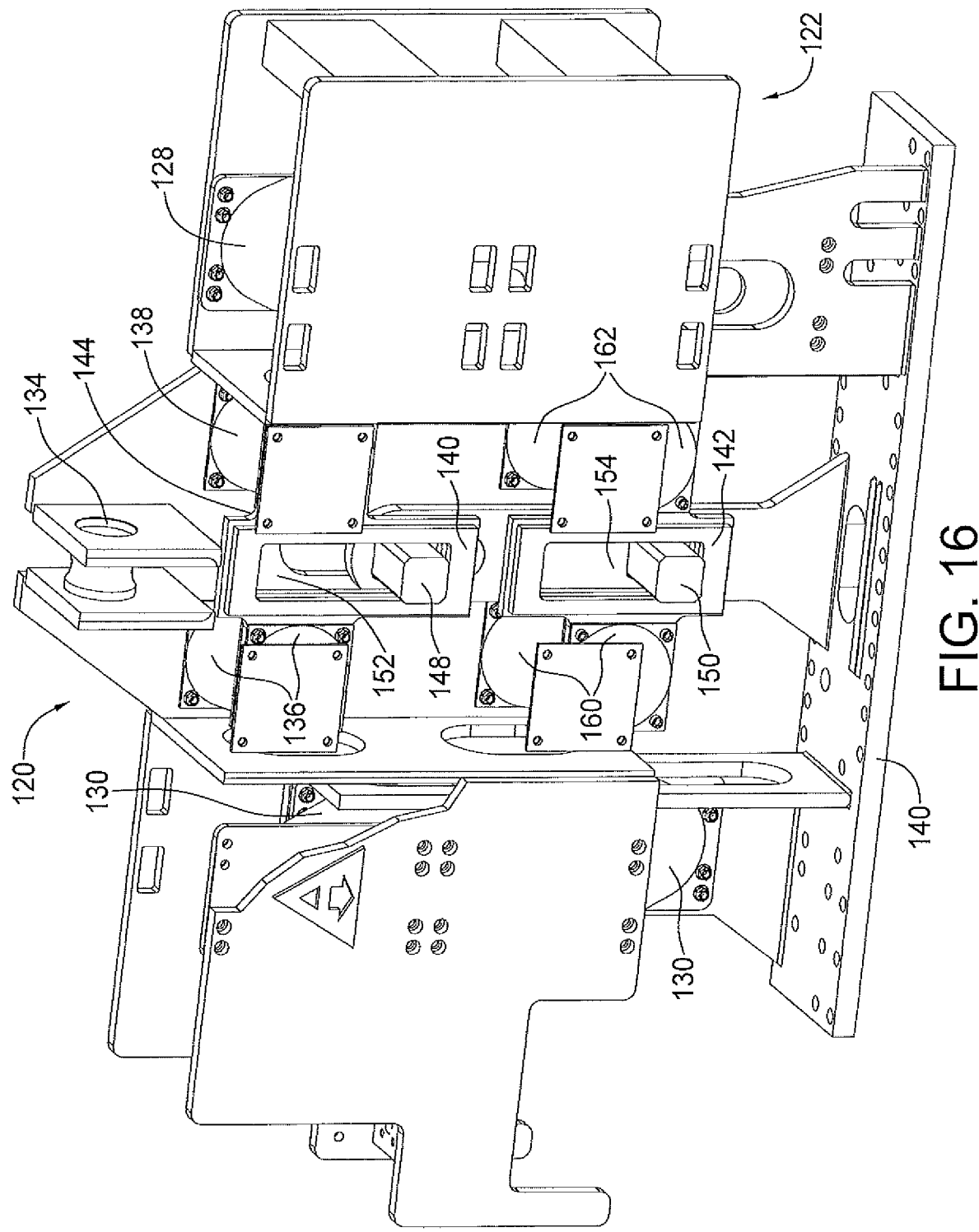
FIG. 16 is a schematic, partially cutaway, view of the second embodiment in a fourth position with a third load.
Figure 17:
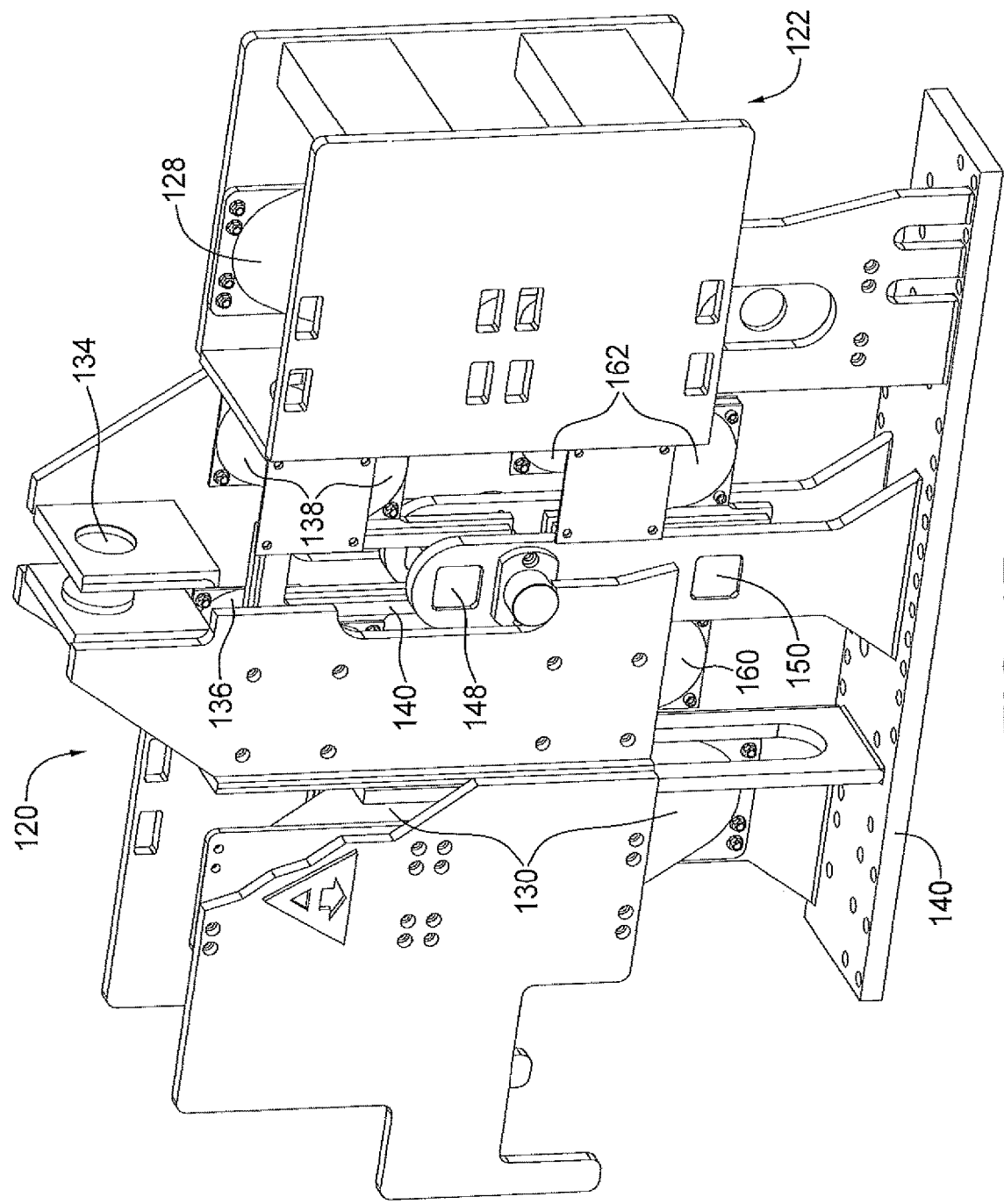
FIG. 17 is a schematic, partially cutaway, view of the second embodiment in a fifth position with a fourth load.
Figure 19C:
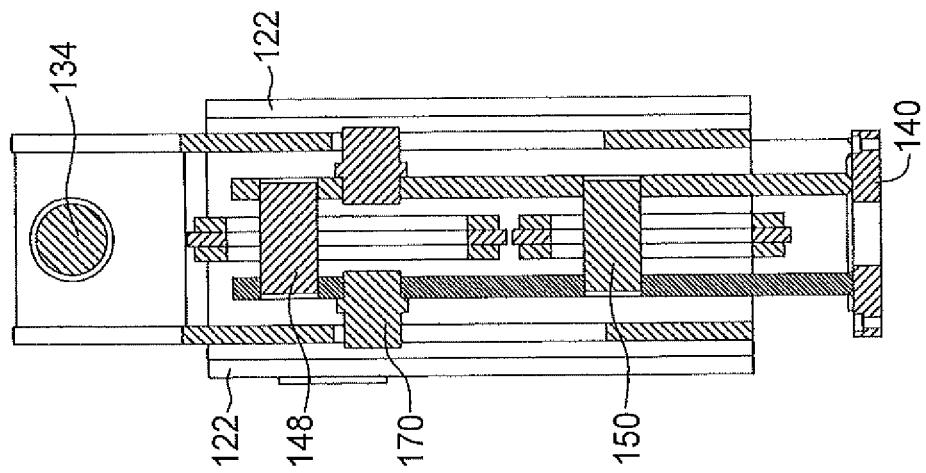
FIG. 19C is a cross-sectional diagram along lines CC in FIG. 18 when the suppressor assembly is in a first position.
Figure 19B:
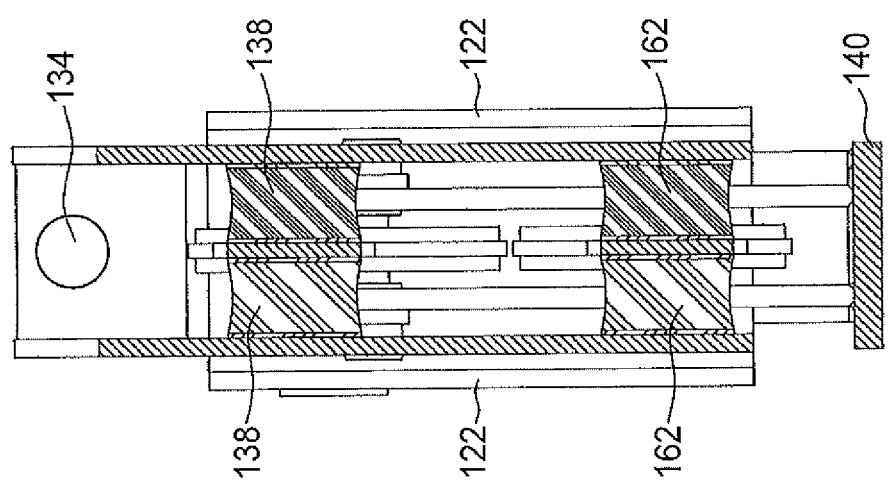
FIG. 19B is a cross-sectional diagram along lines BB in FIG. 18 when the suppressor assembly is in the first position.
Figure 19A:
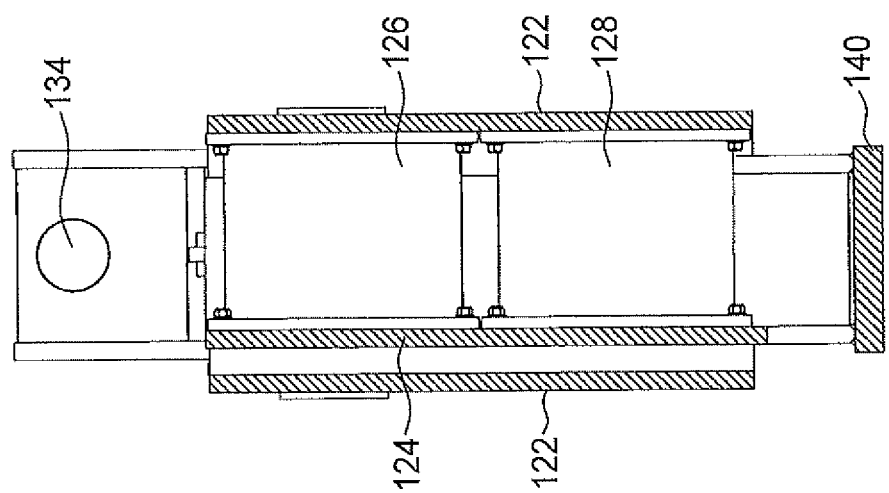
FIG. 19A is a cross-sectional view along lines AA of FIG. 18 when the suppressor assembly of the second embodiment is in a first position.
Figure 20C:
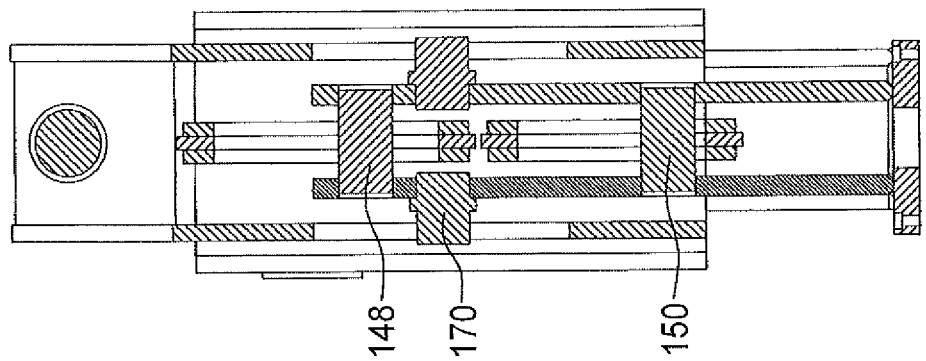
FIG. 20C is a cross-sectional diagram along lines CC in FIG. 18 when the suppressor assembly is in a second position.
Figure 20B:
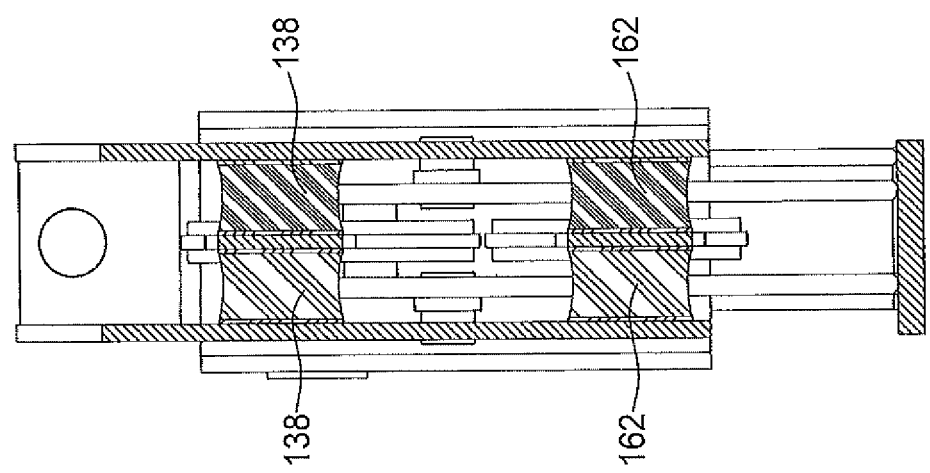
FIG. 20B is a cross-sectional diagram along lines BB in FIG. 18 when the suppressor assembly is in a second position.
Figure 20A:
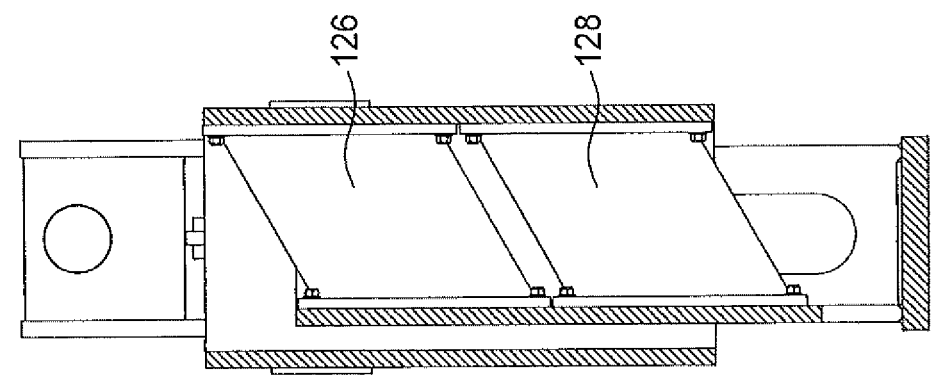
FIG. 20A is a cross-sectional diagram along lines AA in FIG. 18 when the suppressor assembly is in a second position.
Figure 21C:
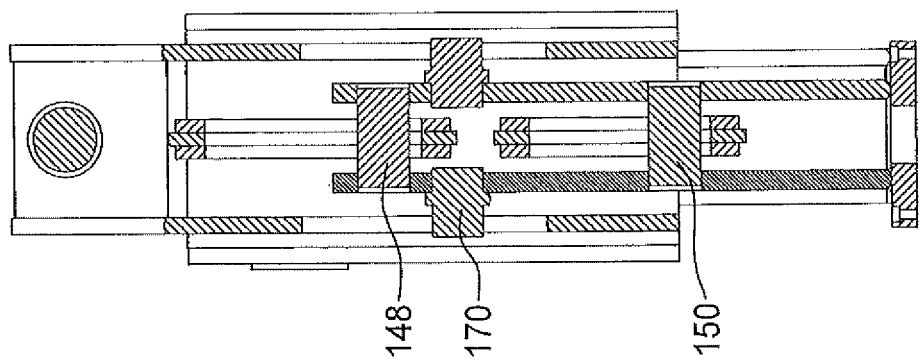
FIG. 21C is a cross-sectional diagram along lines CC in FIG. 18 when the suppressor assembly is in a third position.
Figure 21B:
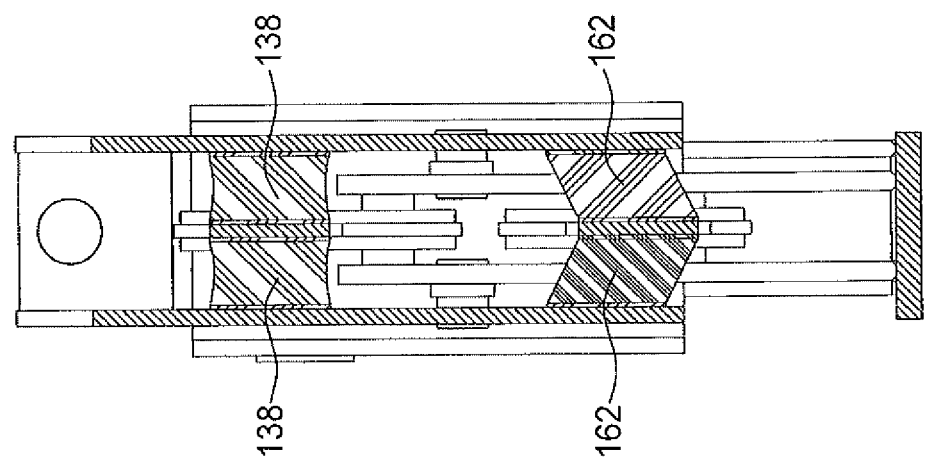
FIG. 21B is a cross-sectional diagram along lines BB in FIG. 18 when the suppressor assembly is in a third position.
Figure 21A:
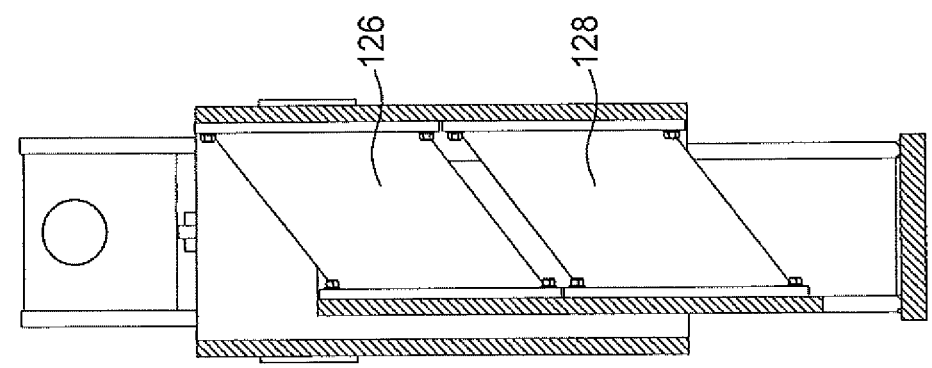
FIG. 21A is a cross-sectional diagram along lines AA in FIG. 18 when the suppressor assembly is in a third position.
Figure 22C:
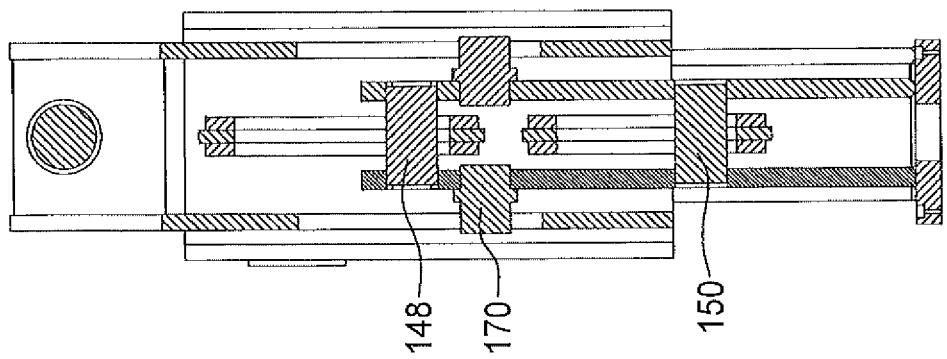
FIG. 22C is a cross-sectional diagram along lines CC in FIG. 18 when the suppressor is in a fourth position.
Figure 22B:
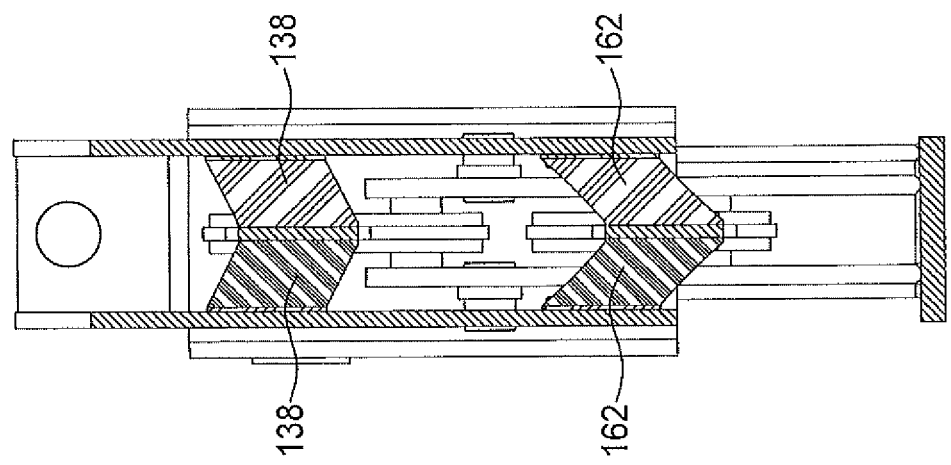
FIG. 22B is a cross-sectional diagram along lines BB in FIG. 18 when the suppressor assembly is in a fourth position.
Figure 22A:
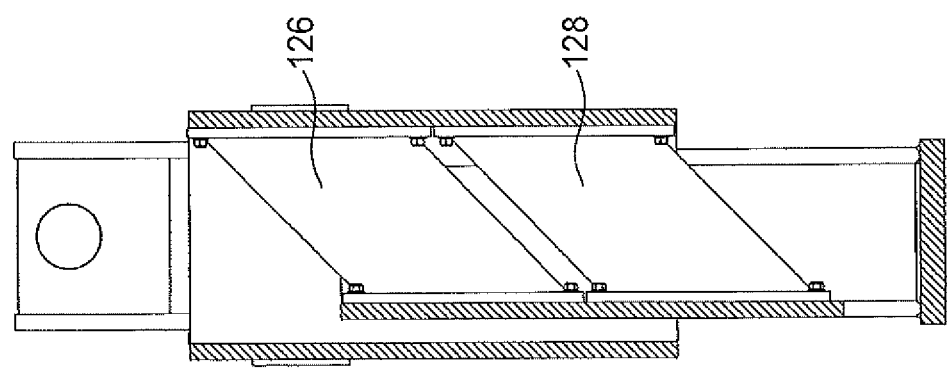
FIG. 22A is a cross-sectional diagram along lines AA in FIG. 18 when the suppressor assembly is in a fourth position.
Figure 23C:
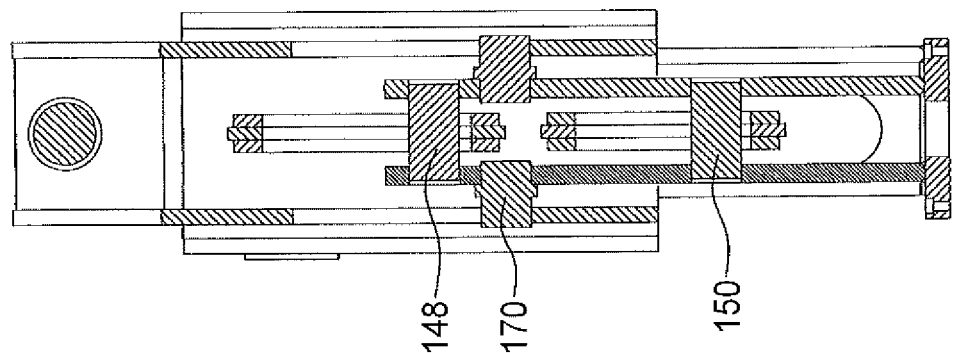
FIG. 23C is a cross-sectional diagram along lines CC in FIG. 8 when the suppressor assembly is in a fifth position.
Figure 23B:
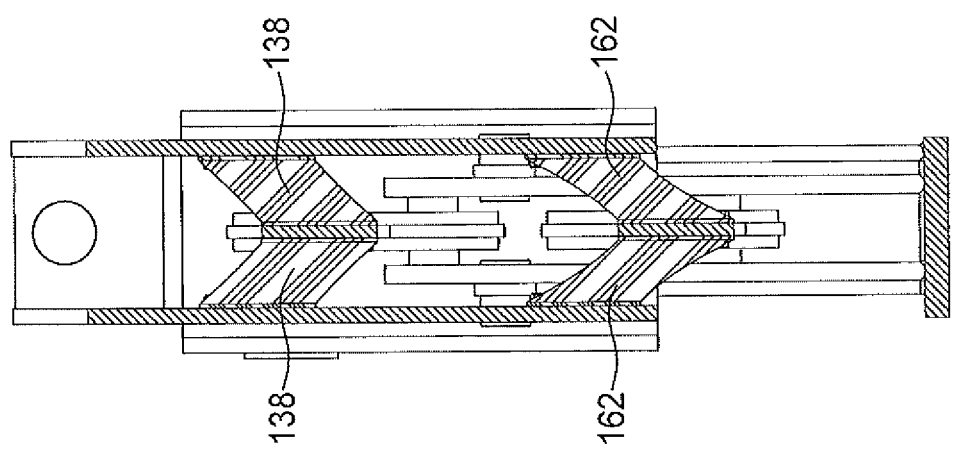
FIG. 23B is a cross-sectional diagram along lines BB in FIG. 18 when the suppressor assembly is in a fifth position.
Figure 23A:
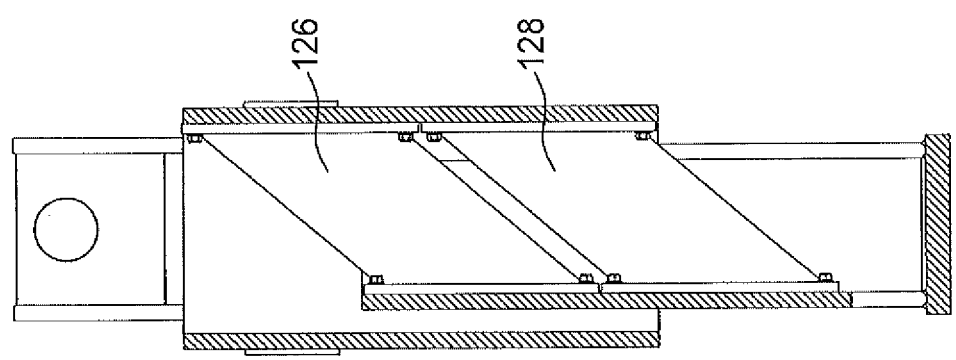
FIG. 23A is a cross-sectional diagram along lines AA in FIG. 18 when the suppressor assembly is in a fifth position.

In FIG. 13, there is no movement of the outer housing (no load) and hence all of the elastomeric members are unstretched. This is shown in cross-section diagrams 19A-19C. FIG. 14 shows a movement of 7 inches for example for outer housing 122. In this position, the lower crossbar 150 engages with the lower T-plate 142, such that T-plate 142 is locked by crossbar 150, while upper crossbar 148 is now a selected distance downwardly in opening 152 of upper T-plate 140. In this position, with about 7 inches of housing movement, the large elastomeric members are stretched. The lower sets of stiff elastomeric members engage but do not stretch. The upper sets of small elastomeric members are not engaged and do not stretch. This is shown in FIGS. 20A and 20C. FIG. 15 shows a raised housing position of 9.5 inches, in which both T-plates are locked with their respective crossbar. In this position, the lower elastomeric sets members stretch 2.5 inches, while the upper members do not yet stretch but are engaged. FIGS. 21A-21C show this position. In a further lifting of the housing 120, for instance 12 inches, both small stiff elastomeric members sets stretch, the lower set 5 inches and the upper set 2.5 inches. This is shown in FIGS. 22A-22C. A further increase in load, with a housing lift of 14.5 inches, is shown at FIG. 17. This results in both lower and upper small elastomeric member sets being stretched, with the lower elastomeric members being stretched 7.5 inches and the upper elastomeric member sets being stretched 5 inches. This is shown in FIGS. 23A-23C. The two-bar second embodiment also includes a safety pin 170 which prevents further travel of the housing in the event that the elastomeric members fail or sheer.

Accordingly, the present invention is directed toward a three-stage suppressor arrangement, involving a first set of elastomeric members and in addition a plurality of small, stiff elastomeric members, arranged in two sets, mounted so that the engagement and stretching of the separate two sets occur in a sequence which provides a smooth transition as the tension load increases for the suppressor assembly over a range of for instance 4 tons per inch with large elastomeric members to 8 tons per inch using the large elastomers and a plurality of small elastomeric members.

Figure 24:
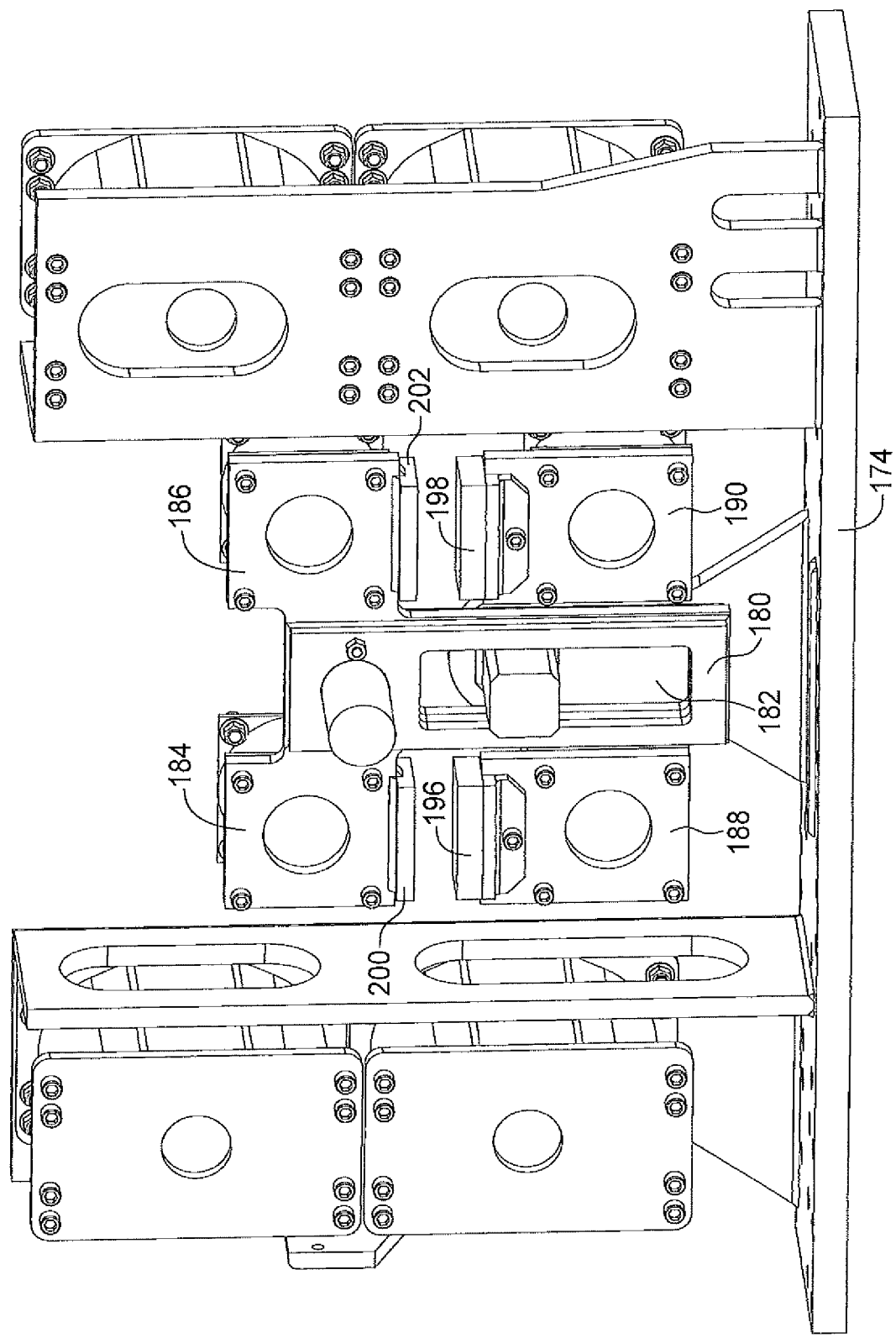
FIG. 24 is a schematic diagram of an alternative to the first embodiment of the present invention.
Figure 25:
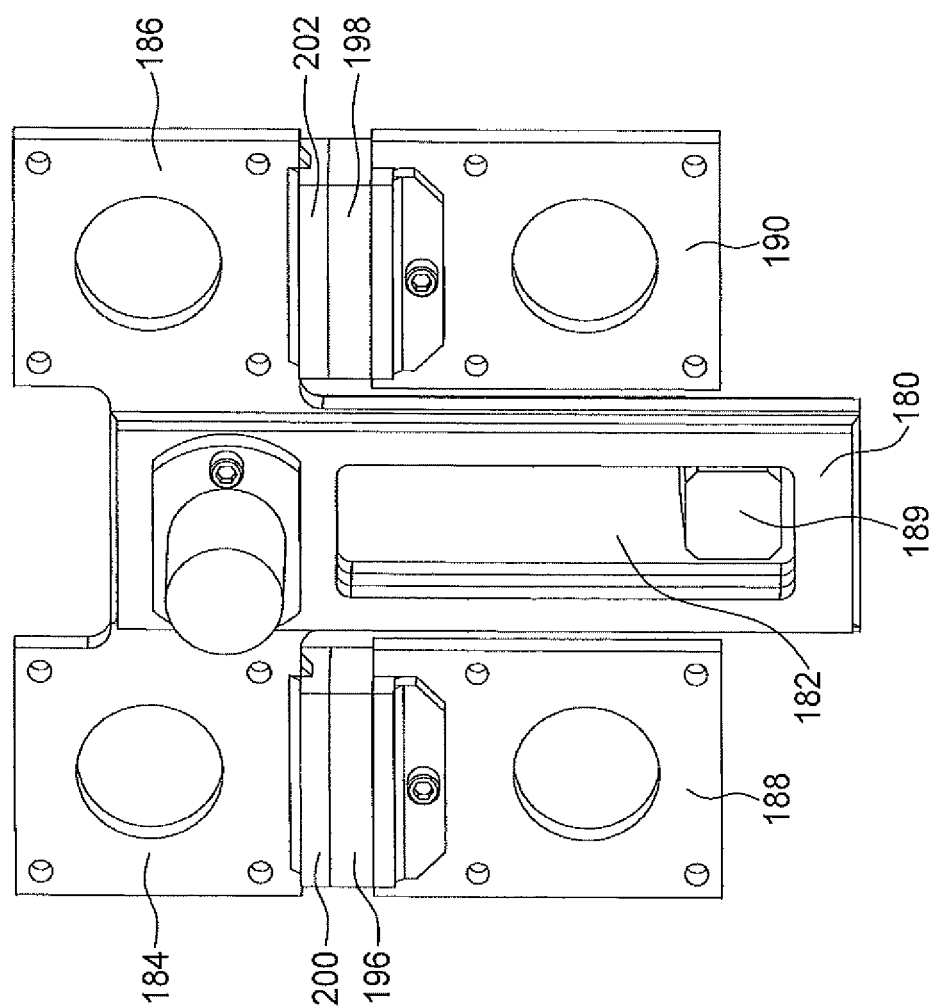
FIG. 25 is a diagram showing a part of the structure of FIG. 24.

FIGS. 24 and 25 show an alternative to the first embodiment of FIGS. 2-13. The embodiment also includes a T-plate 180 with an open center area 182. Extending through the open center area is a crossbar 184 which is attached to a support assembly, which is attached in turn to the base 174 of the suppressor. All of the above are similar to the embodiment of FIGS. 2-13. Helping to support the upper small elastomeric members are plates 184 and 186 while lower small elastomeric are supported by plates 188 and 190. However, instead of the round pin contacts and the concave portions, such as shown in FIGS. 2-13, cushion pads such as rubber or elastomeric material are used. Cushion pads 196, 198 are positioned on the upper surface of plates 188 and 190 and cushion plates 200 and 202 are positioned on the lower surface of the upper plates 184, 186. FIG. 25 shows the suppressor in a position without a load, similar to FIG. 2, while the absorbing pads are engaged in FIG. 24.

Although a preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. A shock-absorbing apparatus for use with a pile driving and/or pile pulling vibratory device and a carrying member for supporting the vibratory device, the shock-absorbing apparatus comprising:
   a base portion adapted for connection to the vibratory device;
   an outer housing section supported by a carrying member, wherein tension loads are applied to the carrying member;
   a first shock-absorbing assembly, comprising a first set of elastomeric members, connected between the outer housing section and the base portion for absorbing the vibratory action or force generated by the vibratory device for a first tension load with a selected range as the outer housing section is raised;
   a second shock-absorbing assembly, comprising a second plurality of elastomeric members, for absorbing the vibratory action or force generated by the vibratory device for an additional tension load greater than the selected range of tension load as the outer housing section continues to be raised; and
   a third shock-absorbing assembly, comprising a third plurality of elastomeric members, separate from the second shock-absorbing assembly, operative to begin absorbing vibratory action or force generated by the vibration device for the additional tension load following initial operation of the second shock absorbing assembly, providing a shock absorbing transition between the first and additional tension loads and operation of the first and second shock absorbing assemblies.

2. The apparatus of claim 1, including support elements located on the opposing ends of the shock absorbing apparatus for supporting the first shock-absorbing assembly.

3. The apparatus of claim 2, wherein the second plurality of elastomeric members are supported within the outer housing section so as to begin stretching to absorb increasing load greater than the selected range of tension load.

4. The apparatus of claim 3, wherein the third plurality of elastomeric members are supported within the outer housing section for providing a shock absorbing transition between action of the first and second shock absorbing assemblies.

5. The apparatus of claim 1, including a T-plate having an open center area attached to the outer housing section and a crossbar extending through the open center area and mounted so that it does not move with the outer housing section until the T-plate is locked by the crossbar.

6. The apparatus of claim 4, wherein the second plurality of elastomeric members are supported on an internal upper plate or plates, and the third plurality of elastomeric members are supported on an internal lower plate or plates and wherein the second plurality of elastomeric members begin to stretch to absorb force before the third plurality of elastomeric members begin to stretch to absorb force, wherein the third plurality of elastomeric members are configured to provide a transition over a wide range of load.

7. The apparatus of claim 6, including cushion pads mounted on top of the lower plates and at the bottom of the upper plates, so that contact between the plates is softened by the cushion pads.

8. The apparatus of claim 1, including two T-plates having open center areas, an upper one above a lower one, and two crossbars extending through said openings, wherein the lower T-plate is locked by its associate crossbar prior to the upper T-plate being locked by its associated crossbar as the housing is raised with increasing load.

9. The apparatus of claim 1, wherein the transition occurs without a substantial increase in noise and vibration of the shock absorbing apparatus.

10. The apparatus of claim 4, including a safety pin which prevents further travel of the outer housing section in the event that the first, and second and third pluralities of elastomeric members fail or shear.

* * * * *